United States Patent [19]

Asada et al.

[11] Patent Number: 5,165,308

[45] Date of Patent: * Nov. 24, 1992

[54] SHIFT CONTROL SYSTEM AND METHOD FOR AUTOMATIC TRANSMISSIONS

[75] Inventors: Toshiyuki Asada, Susono; Hideo Tomomatsu; Yasuo Hojo, both of Nagoya, all of Japan

[73] Assignee: Toyota Jidosha Kabushiki Kaisha, Toyota, Japan

[*] Notice: The portion of the term of this patent subsequent to Feb. 18, 2009 has been disclaimed.

[21] Appl. No.: 606,849

[22] Filed: Oct. 31, 1990

[30] Foreign Application Priority Data

Nov. 4, 1989 [JP] Japan .................................. 1-287691
Nov. 4, 1989 [JP] Japan .................................. 1-287692
Nov. 8, 1989 [JP] Japan .................................. 1-292034
Mar. 6, 1990 [JP] Japan .................................. 2-54479

[51] Int. Cl.$^5$ ............................................. F16H 3/66
[52] U.S. Cl. .................................. 74/866; 364/424.1; 475/276; 475/330
[58] Field of Search ............... 475/218, 219, 254, 257, 475/275, 276, 277, 278, 279, 288, 290, 329, 330, 121, 123; 74/866, 336 R; 364/424.1

[56] References Cited

U.S. PATENT DOCUMENTS

| | | | |
|---|---|---|---|
| 2,825,245 | 3/1958 | Hobbs | 475/278 |
| 3,043,163 | 7/1962 | Hobbs | 475/277 X |
| 3,115,793 | 12/1963 | Hobbs | 475/277 |
| 3,596,537 | 8/1971 | Koivunen | 192/85 AA X |
| 3,678,785 | 7/1972 | Stahlberg | 475/281 |
| 3,848,518 | 11/1974 | Martin | 192/85 AA X |
| 3,863,524 | 2/1975 | Mori et al. | 475/281 X |
| 3,946,623 | 3/1976 | Murakami et al. | 475/276 |
| 3,964,584 | 6/1976 | Bucksch | 192/87.11 |
| 3,971,268 | 7/1976 | Murakami et al. | 475/276 |
| 3,999,448 | 12/1976 | Murakami et al. | 475/276 |
| 4,143,562 | 3/1979 | Murakami et al. | 475/276 |
| 4,225,026 | 9/1980 | Yamamori et al. | 192/85 AA |
| 4,233,861 | 11/1980 | Gaus et al. | 475/56 |
| 4,395,925 | 8/1983 | Gaus | 475/284 X |
| 4,450,944 | 5/1984 | Fujioka | 192/85 AA X |
| 4,653,348 | 3/1987 | Hiraiwa | 475/276 |
| 4,660,439 | 4/1987 | Hiraiwa | 475/277 X |
| 4,744,267 | 5/1988 | Lepelletier | 475/276 |

FOREIGN PATENT DOCUMENTS 381538 8/1990 European Pat. Off. ............ 475/330
3935570 5/1990 Fed. Rep. of Germany .
2108219 5/1983 United Kingdom .......... 192/85 AA Primary Examiner—Leslie A. Braun
Assistant Examiner—Khoi Q. Ta
Attorney, Agent, or Firm—Oblon, Spivak, McClelland, Maier & Neustadt

[57] ABSTRACT

A shift control system and method for use in an automatic transmission includes a plurality of frictional engagement elements and a gear train settable to a plurality of speed stages of different gear ratios according to the engagement/release states of the frictional engagement means and having a plurality of different engagement/release combinations for the frictional engagement elements to set a predetermined one of the speed stages. A shift decision unit decides a shift to be performed. A speed stage selection determines a speed stage to be set after the shift. An engagement/release pattern selects and outputs one of the engagement/release combinations of the frictional engagement elements for setting a speed in which either the current speed stage or the speed stage to be set after the shift is the predetermined speed stage, wherein two or less of the frictional engagement elements have their engagement/release states switched during the shift.

22 Claims, 13 Drawing Sheets

SHIFT CONTROL SYSTEM AND METHOD FOR AUTOMATIC TRANSMISSIONS

BACKGROUND OF THE INVENTION

The present invention relates to a technology for controlling the shifts of an automatic transmission.

A vehicular automatic transmission generally uses a plurality of planetary gear sets, each of which is composed of revolving components such as a sun gear, a ring gear and a carrier. The automatic transmission is constructed by connecting predetermined ones of the revolving components, by connecting any of the revolving component selectively to an input shaft through clutch means, by fixing another revolving component selectively by brake means, and by connecting an output shaft to still another revolving component. In the automatic transmission thus constructed, the number of speed stages to be set, the gear ratios at the individual speed stages, and the number of revolution, loads or torques of the revolving components are varied in dependence upon the number of the planetary gear sets used, the manner how to connect the individual revolving components, and the number of and the manner how to dispose frictional engagement means such as the clutch means or the brake means, so that a remarkable variety of automatic transmissions can be constructed. All the structures could not be put into practical use, although they could be made in principle. It is not easy in the least to create a structure which can sufficiently meet the practical requirements such as feasible production, small size and low weight, ample shift controllability and excellent durability. For example, even an automatic transmission using three planetary gear sets to set forward five and reverse one speed stages might have an excessively large gear ratio for the reverse stage in dependence upon the manners how to arrange the frictional engagement means such as the clutches and how to adopt the gear ratio (i.e., the ratio of tooth numbers of the sun gears and the ring gears). For this automatic transmission, it would be necessary to increase the capacities of the frictional engagement means, thus raising a problem that the durabilities of the frictional engagement means and the bearing might be deteriorated. In order to solve this problem, as disclosed in Japanese Patent Laid-Open No. 60-57036, there is proposed an automatic transmission which is constructed to have a reverse gear ratio approximate to that for the forward 1st speed.

The structure of the automatic transmission according to this proposal will be briefly described in the following. This automatic transmission is composed mainly of three single pinion type planetary gear sets and is constructed by connecting the sun gear of the first planetary gear set and the sun gear of the second planetary gear set always or selectively, by connecting the sun gear of the first planetary gear set and the carrier of the second planetary gear set, if necessary, through a clutch, by connecting the ring gear of the second planetary gear set and the ring gear of the third planetary gear set, by connecting the carrier of the first planetary gear set with those ring gears, and by connecting the carrier of the second planetary gear set and the sun gear of the third planetary gear set through a clutch. The input shaft is connected through a clutch to the sun gears of the first and second planetary gear sets, which are connected to each other, and further to the ring gear of the first planetary gear set through another clutch. On the other hand, the output shaft is connected to the carrier of the third planetary gear set. As the brake means for stopping the revolutions, moreover, there are provided a brake for fixing the sun gear of the first planetary gear set and the sun gear of the second planetary gear set and a brake for fixing the sun gear of the third planetary gear set. In the automatic transmission thus disclosed in Japanese Patent Laid-Open No. 60-57036, for the forward 1st speed, the revolutions of the carrier of the second planetary gear set are blocked by engaging both the brake for fixing the sun gear of the third planetary gear set and the clutch for connecting the carrier of the second planetary gear set to that sun gear. For the reverse stage, too, the carrier of the second planetary gear set is fixed. And, the gear ratios at these forward 1st speed and reverse stage are given approximate values.

Incidentally, the structure, in which a one-way clutch is interposed between the carrier of the second planetary gear set and the casing, is shown in skeleton diagram in the aforementioned Japanese Patent Laid-Open No. 60-57036. However, this Laid-Open has failed to disclose the corresponding clutch and brake application chart and describe the speed stages to be set. Therefore, it is conceivable that the structure arranged with the additional one-way clutch sets the individual speed stages like other embodiments disclosed.

The automatic transmission thus disclosed in the prior art is enabled to set forward seven speeds and reverse one speed as a whole by adding 2.5th and 3.5th speeds to the main speed stages of forward five and reverse one speeds. However, the combination of the engagement/release of the clutches and the brakes for setting each of the speed stages is only one. In the automatic transmission of the prior art, therefore, the shift shocks may be deteriorated, or a complex control may be inevitably required for preventing the deterioration of the shift shocks. Specifically, one requisite to be enumerated for improving the shift controllability is that the number of the frictional engagement means to have their engagement/release states switched for a shift must be as small as possible. In the aforementioned automatic transmission, however, for the forward 3rd speed, the following three frictional engagement means are engaged: the clutch (as will be tentatively called the "first clutch") for connecting the input shaft and the sun gear of the first planetary gear set; the clutch (as will be tentatively called the "second clutch") for connecting the input shaft and the ring gear of the first planetary gear set; and the brake (which will be tentatively called the "second brake") for fixing the sun gear of the third planetary gear set. For the forward 4th speed, on the contrary, the following totally four clutches are engaged in addition to the aforementioned first and second clutches: the clutch (as will be tentatively called the "fourth clutch") for connecting the sun gear of the first planetary gear set and the carrier of the second planetary gear set; and the clutch (as will be tentatively called the "fifth clutch") for connecting the carrier of the second planetary gear set and the sun gear of the third planetary gear set. As a result, the engagement/release states of the three engagement means of the fourth and fifth clutches and the second brake have to be switched in case of a shift between the forward 3rd and 4th speeds. This makes it difficult to hold the engagement/release timings of those frictional engagement means proper at all times. This causes problems that the shift shocks are enlarged if the engagement/release goes out of timing and that the oil pressure to be fed to or drained from the hydraulic servomechanism has to be finely controlled to make the engagement/release timing proper.

Incidentally, it is well known in the art that the shift control of the automatic transmission is performed by using as its parameters both the engine load represented by the throttle opening and the vehicle speed. In case, therefore, the shift lever is moved to the drive range while the vehicle is in its stop position, the speed stage is set at first to the 1st speed. Because this 1st step has the largest gear ratio in the forward stages, the high torque may be abruptly applied to the output shaft to cause a phenomenon that the vehicular body has its rear diving. In order to lighten this so-called "squat", the following is the current practice of the prior art. In case the 1st speed is selected in the state of satisfying the predetermined conditions that the vehicle speed is not higher than a predetermined reference value and that the cooling water temperature is not higher than a predetermined level, the controls are made by setting the speed stage temporarily to another speed stage, e.g., the 3rd speed having a larger gear ratio and then to the 1st speed. Let the case be considered, in which the squat reduction control is to be performed in the automatic transmission disclosed in the aforementioned Japanese Patent Laid-Open No. 60-57036. In this case, the second clutch, the third clutch, the fifth clutch and the second brake are engaged for the 1st speed, whereas the first clutch, the second clutch and the second brake are engaged for the 3rd speed. If the speed stage is to be set temporarily to the 3rd speed and then to the 1st speed, it is necessary to release the first clutch and to engage the third clutch and the fifth clutch. This increases the number of the frictional engagement means to have their engagement/release states switched. As a result, the engagement/release timings are difficult to hold properly, and the shift shocks might be increased even if the squat could be reduced. It is, therefore, conceivable to reduce the squat by setting the speed stage temporarily to the 4th speed in place of the 3rd speed. For a subsequent shift to the 1st speed of this case, the first and fourth clutches are released, and the third clutch is engaged. In this case, too, the number of the frictional engagement means having their engagement/release states switched is increased to raise the possibility of the shift shocks. After all, in order to reduce the squat of the aforementioned automatic transmission of the prior art, the 2.5th speed has to be passed, in case of a shift to the 1st speed from a speed stage set temporarily prior to the 1st speed stage, so that the number of frictional engagement means having their engagement/release states switched may be reduced to two or less. Since, however, the 2.5th speed is accompanied by a high output shaft torque, it is difficult to perform a sufficient squat reduction control.

SUMMARY OF THE INVENTION

It is, therefore, a major object of the present invention to reduce the shift shocks and facilitate the shift control.

Another object of the present invention is to make effective use of a plurality of engagement/release combinations of the frictional engagement means.

Still another object of the present invention is to reduce the dive of the rear portion of a vehicular body and the shift shocks when the vehicle is to start.

According to an aspect of the present invention, there is provided a shift control system for use in an automatic transmission comprising: a plurality of frictional engagement means; and a gear set adapted to be set to a plurality of speed stages of different gear ratios according to the engagement/release states of said frictional engagement means and having a plurality of engagement/release combinations for said frictional engagement means to set a predetermined one of said speed stages, wherein the improvement comprises: shift decision means for deciding a shift to be performed from a current speed stage; speed stage selection means for determining a speed stage to be set after said shift; and engagement/release pattern selection means for selecting and outputting such one of the engagement/release combinations of said frictional engagement means for setting a speed stage, wherein at least one of the current speed stage and the speed stage to be set after the shift is said predetermined one of the speed stages, and wherein two or less of said frictional engagement means have their engagement/release states switched for the shift.

According to another aspect of the present invention, there is provided a shift control system for use in an automatic transmission, comprising: low speed stage detection means for detecting that a speed stage to be set subsequent to a neutral state is a low speed stage having a high gear ratio; speed stage selection means for outputting a signal to set another speed stage having a lower gear ratio than that of said low speed stage when said low speed stage detection means outputs its detection signal; and engagement/release pattern selection means for selecting and outputting a combination, in which two or less frictional engagement means have their engagement/release states switched at the time of a shift from said another speed stage to said low speed stage, as the engagement/release combination of said frictional engagement means for setting said low speed stage and the engagement/release combination of said frictional engagement means for setting said another speed stage.

In the shift control method of the present invention, moreover, the engagement/release combination of the frictional engagement means for setting the shift stage before or after the shift is so selected that the number of the frictional engagement means having their engagement/release states switched for executing the shift may be reduced to two or less.

This selection of the engagement/release combination of the frictional engagement means is also performed in case a shift is made to a low speed stage having a high gear ratio once it is set from the neutral state to a high speed stage having a lower gear ratio.

The above and further objects and novel features of the present invention will more fully appear from the following detailed description when the same is read in connection with the accompanying drawings. It is to be expressly understood, however, that the drawings are for the purpose of illustrations only and is not intended as a definition of the limits of the invention.

DETAILED DESCRIPTION OF THE PREFERRED EMBODIMENTS

Figure 1:
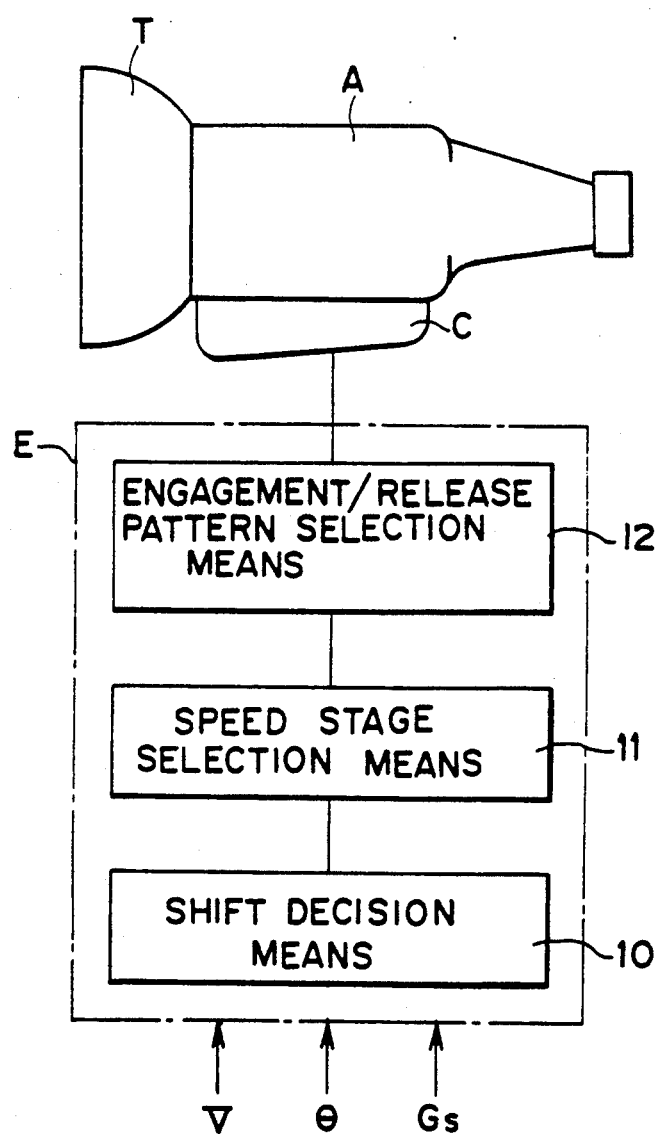
FIG. 1 is a block diagram showing the basic structure of one embodiment of the shift control system.

As shown in FIG. 1, an automatic transmission A is connected to the (not-shown) engine through a torque converter T and is equipped with a gear train and frictional engagement means, as will be described hereinafter. Moreover, the automatic transmission A is set to a plurality of speed stages by engaging or releasing the frictional engagement means with an oil pressure to be outputted from hydraulic control means C.

This hydraulic control means C is equipped, for example, with a plurality of (not-shown) solenoid valves, which are to be turned on or off in response to a signal to be outputted from control means E. This control means E is constructed mainly of a microcomputer which is fed with control data including a vehicle speed V, a throttle opening $\theta$ and a speed stage Gs in the present state. The control means E is equipped with shift decision means 10, speed stage selection means 11 and engagement/release pattern selection means 12.

The shift decision means 10 decides the shift when the running state to be determined from the vehicle speed V and the throttle opening $\theta$ exceeds a predetermined shift point. On the other hand, the speed stage selection means 11 selects a speed stage Ga to be set, on the basis of the vehicle speed V and the throttle opening $\theta$. The engagement/release pattern selection means 12 selects the combination of the engagements and releases of the frictional engagement means (as will be shortly referred to as the "engagement/release pattern") so that the number of frictional engagement means for changing the states of engagement and release may be two or less at the time of a shift from the present speed stage Gs to the target speed stage Ga. After this selection, the engagement/release pattern selection means 12 outputs a signal to the hydraulic control means C so as to establish the engagement/release pattern selected. The reason for capableness of the selection is that there are provided a plurality of kinds of engagement/release patterns for the gear train of the automatic transmission A to set a predetermined speed.

Here will be enumerated the gear train of the automatic transmission A thus constructed.

Figure 2:
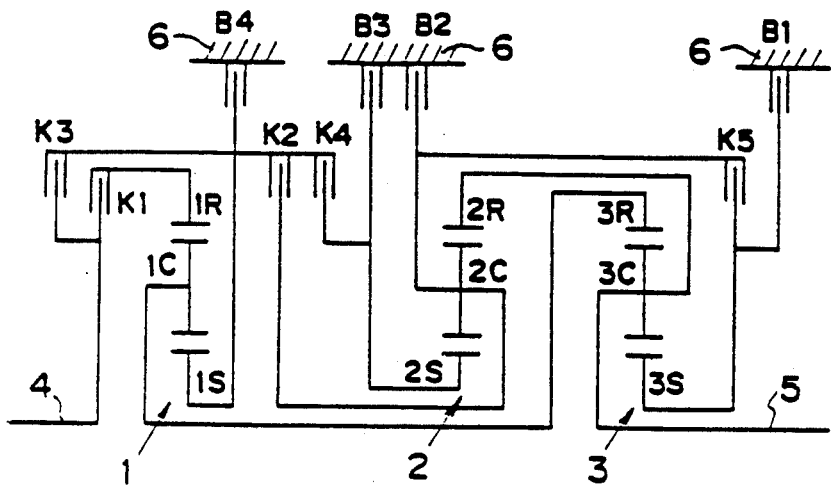
FIGS. 2 and 3 are skeleton diagrams showing examples of the gear train.

An example shown in FIG. 2 is composed mainly of three single-pinion type planetary gear sets 1, 2 and 3, the individual components of which are connected, as follows. The carrier 1C of the first planetary gear set 1 and the ring gear 3R of the third planetary gear set 3 are so connected to each other that they can revolve together, and the ring gear 2R of the second planetary gear set 2 and the carrier 3C of the third planetary gear set 3 are so connected to each other that they can revolve together. Moreover, the sun gear 1S of the first planetary gear set 1 is connected to the carrier 2C of the second planetary gear set 2 through second clutch means K2 and further to the sun gear 2S of the second planetary gear set 2 through fourth clutch means K4. The carrier 2C of the second planetary gear set 2 in turn is connected to the sun gear 3S of the third planetary gear set 3 through the fifth clutch means K5.

Incidentally, the individual components recited above can adopt such a connecting mechanism, e.g., a quill shaft, a solid shaft or a suitable connecting drum as is currently used in the existing automatic transmission.

An input shaft 4 is connected the (not-shown) engine through power transmission means such as a torque converter or a fluid coupling. Between this input shaft 4 and the ring gear 1R of the first planetary gear set 1, there is interposed first clutch means K1 for connecting the two selectively. Between the input shaft 4 and the sun gear 1S of the first planetary gear set 1, on the other hand, there is interposed third clutch means K3 for connecting the two selectively.

In short, the individual clutch means K1, K2, K3, K4 and K5 thus far described are used to connect the aforementioned individual components selectively and to release the connections. These clutch means K1 to K5 to be adopted can be exemplified by a wet type multiple disc clutch, a one-way clutch or the series or parallel arrangement of those multiple disc clutch and one-way clutch, all of which are to be engaged or released by a mechanism such as a hydraulic servomechanism used generally in the automatic transmission of the prior art. Since the individual structural components are restricted in their arrangement for the practical applications, it is quite natural that suitable intermediate members such as connecting drums can be interposed as the connecting members for the clutch means K1, K2, K3, K4 and K5.

Between the sun gear 3S of the third planetary gear set 3 and a transmission casing (which will be shortly referred to as the "casing") 6, on the other hand, there is interposed first brake means B1 for stopping the revolutions of the sun gear 3S selectively. Between the carrier 2C of the second planetary gear set 2 and the casing 6, moreover, there is interposed second brake means B2 for stopping the revolutions of the carrier 2C selectively. Between the sun gear 2S of the second planetary gear set 2 and the casing 6, still moreover, there is interposed third brake means B3 for stopping the revolutions of the sun gear 2S selectively. Between the sun gear 1S of the first planetary gear set 1 and the casing 6, furthermore, there is interposed fourth brake means B4 for stopping the revolutions of the sun gear 1S selectively. These brake means B1, B2, B3 and B4 to be adopted can be exemplified by the wet type multiple disc brake, the band brake or the one-way clutch or their combination, all of which are to be driven by a mechanism such as a hydraulic servomechanism used generally in the automatic transmission of the prior art. For practical uses, it is quite natural that suitable connecting members can be interposed between those brake means B1, B2, B3 and B4 and either the individual components to be fixed by the brake means B1 to B4 or the casing 6.

Moreover, an output shaft 5 for transmitting the revolutions to a propeller shaft or a counter gear (although not shown individually) is connected to the ring gear 2R of the second planetary gear set 2 and the carrier 3C of the third planetary gear set 3, which in turn are connected to each other.

Figure 3:
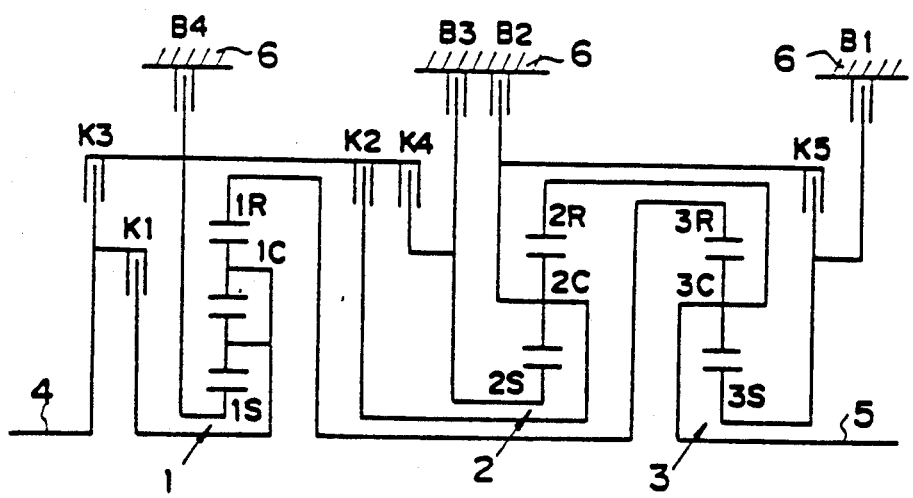

Another example is shown in FIG. 3 and is modified from the aforementioned structure shown in FIG. 2 by replacing the first planetary gear set 1 by a double pinion type planetary gear set. Accordingly, the ring gear 1R of the first planetary gear set 1 is connected to the ring gear 3R of the third planetary gear set 3, and the carrier 1C of the first planetary gear set 1 is connected to the input shaft 4 through the first clutch means K1. The remaining structure is similar to that shown in FIG. 2.

The automatic transmission equipped with the gear sets having those structures, as shown in FIGS. 2 and 3, is enabled to set a plurality of speed stages for forward five and reverse one speeds and additionally the so-called "2.2th, 2.5th and 2.7th" speeds between the forward 2nd and 3rd speeds and the so-called "3.2th and 3.5th" speeds between the forward 3rd and 4th speeds. At the speeds other than the 2.2th, 2.7th, 3.2th and 3.5th speeds, moreover, there are a plurality of sets of engagement/release combinations (i.e., the so-called "engagement/release patterns") of the clutch means and the brake means for setting those speeds.

TABLE 1

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 1st |  | ① | ○ |  |  | ○ | ○ | ○ | * |  |  |
|  |  | ② | ○ |  |  | ○ | ○ | * | ○ |  |  |
|  |  | ③ | ○ |  |  | ○ | * | ○ | ○ |  |  |
| 2nd | a | ① | ○ | ○ |  |  | ○ | ○ | * |  | * |
|  |  | ② | ○ | ○ | ○ |  | ○ | * | ○ | * |  |
|  |  | ③ | ○ | ○ | ○ |  | * | ○ | ○ |  | ○ |
|  |  | ④ | ○ | ○ | ○ |  | * | * | ○ | ○ |  |
|  |  | ⑤ | ○ | ○ | * |  | * | ○ | ○ |  | ○ |
|  |  | ⑥ | ○ | ○ | * |  | ○ | * | ○ |  | ○ |
|  | b | ① | ○ | ○ |  | ○ |  | ○ |  | ○ | * |
|  |  | ② | ○ | ○ |  | * |  | ○ |  | * | ○ |
| 2.2th |  |  | ○ | ○ |  |  |  | ○ |  | ○ |  |
| 2.5th |  | ① | ○ |  |  | ○ | ○ |  | ○ | * |  |
|  |  | ② | ○ |  |  | ○ | ○ |  | * | ○ |  |
|  |  | ③ | ○ |  |  | * | ○ |  | ○ |  | ○ |
| 2.7th |  |  | ○ | ○ |  | ○ |  |  | ○ |  |  |
| 3rd | a | ① | ○ | ○ | ○ |  |  | * | ○ | * |  |
|  |  | ② | ○ | ○ | ○ |  |  | ○ |  | * |  |
|  | b |  | ○ | ○ |  | ○ |  | ○ |  | * |  |
|  | c |  | ○ | ○ | * | ○ | * |  | ○ |  |  |
|  | d |  | ○ |  | ○ | ○ |  |  | ○ |  |  |
| 3.2th |  |  | ○ | ○ |  |  |  | ○ |  |  | ○ |
| 3.5th |  |  | ○ |  | ○ |  |  | ○ |  |  | ○ |
| 4th | a | ① | ○ | * | ○ | ○ | ○ | * |  |  |  |
|  |  | ② | ○ |  | ○ | ○ | * | ○ |  |  |  |
|  |  | ③ | ○ | * | ○ | * | ○ | ○ |  |  |  |
|  |  | ④ | ○ | * | ○ | ○ | ○ | ○ |  |  |  |
|  | b |  |  |  | ○ | ○ | ○ | * |  |  |  |
| 5th | a |  |  |  | ○ | ○ | ○ | * |  | ○ |  |
|  | b |  | * |  | ○ | ○ | ○ |  |  | ○ |  |
|  | c |  |  |  | ○ | ○ | ○ | * |  | ○ |  |
| Rev | a | ① |  |  |  | ○ | ○ | * | * | ○ |  |
|  |  | ② |  |  |  | ○ | ○ | ○ | * | * |  |
|  | b |  | * |  |  | ○ | ○ |  |  | ○ |  |

In Table 1: symbols ○ indicate that the elements are engaged; blanks indicate that the elements are released; and symbols * indicate that the elements may be engaged. In addition, these symbols * further indicate: that neither the gear ratio nor the revolving state is changed even if the elements such as the fifth clutch means K5 or the first brake means B1 at the 1st speed are released; that not the gear ratio but the revolving state is changed if the first brake means B1 is released, as in the pattern of the column b at the 4th speed; and that neither the gear ratio nor the revolving state is changed if the elements such as the fourth clutch means K4 or the third brake means B3 in the patterns in the column b at the 2nd speed are released with the other means indicated at the symbols * being engaged. Moreover, the columns, as designated at reference letters a, b, c, - - -, and so on at the 2nd, 3rd, 4th, 5th and reverse speeds, indicate such ones of the engagement/release patterns for setting the corresponding speed stages that the revolving elements of the planetary gear sets have different numbers of revolution. Still moreover, symbols ①, ②, ③, - - -, and so on designate the kinds of the engagement/release patterns in which the revolving elements of the planetary gear sets do not have different numbers of revolution.

In case it is intended to set such major forward and reverse speed stages, i.e., the forward 1st, 2nd, 3rd, 4th and 5th speeds and the reverse speed of the speed stages to be set by the engagement/release patterns of the frictional engagement means enumerated in Table 1 as have gear ratios closely approximate to the geometric series, it is arbitrary to select any of the engagement/release patterns appearing in Table 1. However, what is important for the shifts is to have small shift shocks so that the engagement/release pattern is selected to reduce such revolving fluctuations of the elements of the individual planetary gear sets as follow the shifts. In the automatic transmission constructed of the gear train having the aforementioned structures shown in FIGS. 2 and 3: the forward 1st speed is selected according to any of the three patterns of Table 1; the 2nd speed is selected according to either of the patterns appearing in the column b of Table 1; the 3rd speed is selected according to either of the two patterns appearing in the column a of Table 1; the 4th speed is selected according to any of the patterns appearing in the column a; the 5th speed is selected according to the engagement/release pattern appearing in the column a; and the reverse speed stage is selected according to either of the patterns appearing in the column a.

The control means E shown in FIG. 1 selects a suitable one from the aforementioned engagement/release patterns in the following manner to set the aforementioned major speed stages.

Figure 4:
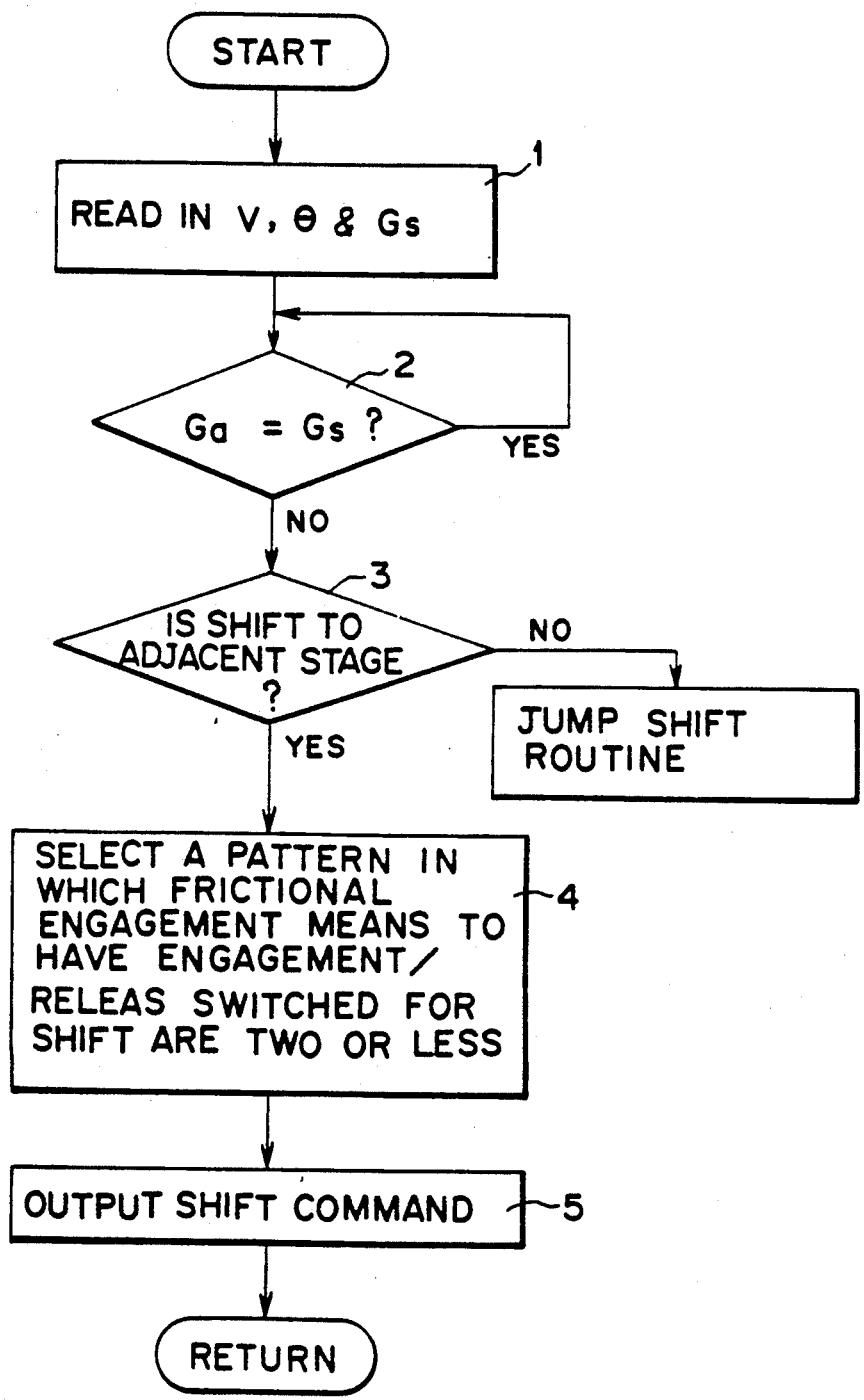
FIG. 4 is a flow chart for explaining one embodiment of the shift control method.

FIG. 4 is a flow chart for explaining one example of the shift control method. At Step 1, the vehicle speed V, the throttle opening θ and the present speed stage Gs are read in. Next, the target speed stage Ga is determined from the shift diagram on the basis of the vehicle speed V and the throttle opening θ, and it is decided at Step 2 whether or not the target speed stage Ga is identical to the present one Gs. Then, the routine returns to before Step 2, if YES, but advances to Step 3, at which it is decided whether or not the target speed stage Ga is one adjacent to the present speed stage. If NO, the routine advances to one in which the so-called "jumping shift" having another intermediate speed stage is to be executed. If YES, there is selected (at Step 4) an engagement/release pattern in which the frictional engagement means to have their engagement/release states switched upon execution of the shift are two or less. Then, a shift command signal for achieving the engagement/release pattern selected is outputted (at Step 5) to the hydraulic control means C.

The engagement/release patterns to be selected by the above-specified method for the automatic transmission A having the gear train shown in FIG. 2 are exemplified in Tables 2 to 9. Incidentally, in the following Tables, symbols ⊙ indicate that the elements had better be engaged from the standpoint of controls although they may be released, and symbols Δ indicate that the elements had better be released from the standpoint of controls although they may be engaged.

TABLE 2

|  |  |  | Clutch Means |  |  |  |  | Brake Means |  |  |  |
|---|---|---|---|---|---|---|---|---|---|---|---|
|  |  |  | K1 | K2 | K3 | K4 | K5 | B1 | B2 | B3 | B4 |
| 1st |  | ③ | ○ |  |  | ○ | △ | ○ | ○ |  |  |
| 2nd | b | ① | ○ |  |  | ○ |  | ○ |  | ○ | △ |
| 3rd | c |  | ○ |  | ○ | ⊙ |  | ○ |  |  |  |
| 4th | a | ① | ⊙ | ○ | ○ | ○ | △ |  |  |  |  |
|  | a | ① | △ | ○ | ○ | ○ | ⊙ |  |  |  |  |
| 5th | a |  |  | ○ | ○ |  | ⊙ |  |  |  | ○ |
| Rev | a | ① |  |  |  | ○ | △ | ⊙ | ○ |  |  |

TABLE 3

|  |  |  | Clutch Means |  |  |  |  | Brake Means |  |  |  |
|---|---|---|---|---|---|---|---|---|---|---|---|
|  |  |  | K1 | K2 | K3 | K4 | K5 | B1 | B2 | B3 | B4 |
| 1st |  | ③ | ○ |  |  | ○ | △ | ○ | ○ |  |  |
| 2nd | b | ② | ○ |  |  | ⊙ |  | ○ |  | △ | ○ |
| 3rd | c |  | ○ |  | ○ | ⊙ |  | ○ |  |  |  |
| 4th | a | ① | ⊙ | ○ | ○ | ○ | △ |  |  |  |  |
|  | a | ① | △ | ○ | ○ | ○ | ⊙ |  |  |  |  |
| 5th | a |  |  | ○ | ○ |  | ⊙ |  |  |  | ○ |
| Rev | a | ① |  |  |  | ○ | △ | ⊙ | ○ |  |  |

TABLE 4

|  |  |  | Clutch Means |  |  |  |  | Brake Means |  |  |  |
|---|---|---|---|---|---|---|---|---|---|---|---|
|  |  |  | K1 | K2 | K3 | K4 | K5 | B1 | B2 | B3 | B4 |
| 1st |  | ③ | ○ |  |  | ○ | △ | ○ | ○ |  |  |
| 2nd | b | ① | ○ |  |  | ○ |  | ○ |  | ○ | △ |
| 3rd | c |  | ○ |  | ○ | ⊙ |  | ○ |  |  |  |
| 4th | a | ① | ⊙ | ○ | ○ | ○ | △ |  |  |  |  |
|  | a |  | ⊙ | ○ | ○ | ○ |  |  | ⊙ |  |  |
|  | a | ② | ○ | ○ | ○ | △ | ○ |  |  |  |  |
| 5th | a |  |  | ○ | ○ |  | ⊙ |  |  |  | ○ |
| Rev | a | ① |  |  |  | ○ | △ | ⊙ | ○ |  |  |

TABLE 5

|  |  |  | Clutch Means |  |  |  |  | Brake Means |  |  |  |
|---|---|---|---|---|---|---|---|---|---|---|---|
|  |  |  | K1 | K2 | K3 | K4 | K5 | B1 | B2 | B3 | B4 |
| 1st |  | ③ | ○ |  |  | ○ | △ | ○ | ○ |  |  |
| 2nd | b | ② | ○ |  |  | ⊙ |  | ○ |  | △ | ○ |
| 3rd | c |  | ○ |  | ○ | ⊙ |  | ○ |  |  |  |
| 4th | a | ① | ⊙ | ○ | ○ | ○ | △ |  |  |  |  |
|  | a |  | ⊙ | ○ | ○ | ○ |  |  | ⊙ |  |  |
|  | a | ② | ○ | ○ | ○ | △ | ○ |  |  |  |  |
| 5th | a |  |  | ○ | ○ |  | ⊙ |  |  |  | ○ |
| Rev | a | ① |  |  |  | ○ | △ | ⊙ | ○ |  |  |

TABLE 6

|  |  |  | Clutch Means |  |  |  |  | Brake Means |  |  |  |
|---|---|---|---|---|---|---|---|---|---|---|---|
|  |  |  | K1 | K2 | K3 | K4 | K5 | B1 | B2 | B3 | B4 |
| 1st |  | ③ | ○ |  |  | ○ | △ | ○ | ○ |  |  |
| 2nd | b | ① | ○ |  |  | ○ |  | ○ |  | ○ | △ |
| 3rd | c |  | ○ |  | ○ | ⊙ |  | ○ |  |  |  |
| 4th | a | ④ | ○ | △ | ○ | ○ |  | ○ |  |  |  |
|  | a |  | ○ | ⊙ | ○ | ○ | ○ |  | ⊙ |  |  |
|  | a | ② | ○ | ○ | ○ | △ | ○ |  |  |  |  |
| 5th | a |  |  | ○ | ○ |  | ⊙ |  |  |  | ○ |
| Rev | a | ① |  |  |  | ○ | △ | ⊙ | ○ |  |  |

TABLE 7

|  |  |  | Clutch Means |  |  |  |  | Brake Means |  |  |  |
|---|---|---|---|---|---|---|---|---|---|---|---|
|  |  |  | K1 | K2 | K3 | K4 | K5 | B1 | B2 | B3 | B4 |
| 1st |  | ③ | ○ |  |  | ○ | △ | ○ | ○ |  |  |
| 2nd | b | ② | ○ |  |  | ⊙ |  | ○ |  | △ | ○ |
| 3rd | c |  | ○ |  | ○ | ⊙ |  | ○ |  |  |  |
| 4th | a | ④ | ○ | △ | ○ | ○ |  | ○ |  |  |  |
|  | a |  | ○ | ⊙ | ○ | ○ | ○ |  | ⊙ |  |  |
|  | a | ② | ○ | ○ | ○ | △ | ○ |  |  |  |  |
| 5th | a |  |  | ○ | ○ |  | ⊙ |  |  |  | ○ |

TABLE 7-continued

|  |  |  | Clutch Means |  |  |  |  | Brake Means |  |  |  |
|---|---|---|---|---|---|---|---|---|---|---|---|
|  |  |  | K1 | K2 | K3 | K4 | K5 | B1 | B2 | B3 | B4 |
| Rev | a | ① |  |  |  | ○ | △ | ⊙ | ○ |  |  |

TABLE 8

|  |  |  | Clutch Means |  |  |  |  | Brake Means |  |  |  |
|---|---|---|---|---|---|---|---|---|---|---|---|
|  |  |  | K1 | K2 | K3 | K4 | K5 | B1 | B2 | B3 | B4 |
| 1st |  | ③ | ○ |  |  | ○ | △ | ○ | ○ |  |  |
| 2nd | b | ① | ○ |  |  | ○ |  | ○ |  | ○ | △ |
| 3rd | c |  | ○ |  | ○ | ⊙ |  | ○ |  |  |  |
| 4th | a | ④ | ○ | △ | ○ | ○ |  | ○ |  |  |  |
|  | a |  | ○ | ⊙ | ○ | ○ | ○ |  | ⊙ |  |  |
|  | a | ① | △ | ○ | ○ | ○ | ⊙ |  |  |  |  |
| 5th | a |  |  | ○ | ○ |  | ⊙ |  |  |  | ○ |
| Rev | a | ① |  |  |  | ○ | △ | ⊙ | ○ |  |  |

TABLE 9

|  |  |  | Clutch Means |  |  |  |  | Brake Means |  |  |  |
|---|---|---|---|---|---|---|---|---|---|---|---|
|  |  |  | K1 | K2 | K3 | K4 | K5 | B1 | B2 | B3 | B4 |
| 1st |  | ③ | ○ |  |  | ○ | △ | ○ | ○ |  |  |
| 2nd | b | ② | ○ |  |  | ⊙ |  | ○ |  | △ | ○ |
| 3rd | c |  | ○ |  | ○ | ⊙ |  | ○ |  |  |  |
| 4th | a | ④ | ○ | △ | ○ | ○ |  | ○ |  |  |  |
|  | a |  | ○ | ⊙ | ○ | ○ | ○ |  | ⊙ |  |  |
|  | a | ① | △ | ○ | ○ | ○ | ⊙ |  |  |  |  |
| 5th | a |  |  | ○ | ○ |  | ⊙ |  |  |  | ○ |
| Rev | a | ① |  |  |  | ○ | △ | ⊙ | ○ |  |  |

Here will be described the example which is tabulated in Table 2. The forward 1st speed is set according to the pattern ③, i.e., by engaging the first clutch means K1, the fourth clutch means K4, the first brake means B1 and the second brake means B2. In this case, the fifth clutch means K5 may be engaged but is released before execution of the shift. The forward 2nd speed is set by selecting the pattern ① of the column b, i.e., by engaging the first clutch means K1, the fourth clutch means K4, the first brake means B1 and the third brake means B3. Thus, the shift from the state of the 1st speed to the 2nd speed is executed by switching the engagement/release states of the second brake means B2 the third brake means B3, i.e., by releasing the second brake means B2 and engaging the third brake means B3. In this case, the fourth brake means B4 can be engaged but is released before execution of the shift. Here, the pattern for switching the engagement/release states of the two frictional engagement means for setting the forward 2nd speed should not be limited to the aforementioned pattern ① of the column b but may be the pattern ④ of the column a and the pattern ② of the column b. According to the pattern ④ of the column a, however, the engagement/release states of three or more frictional engagement means have to be switched for a later-described shift to the 3rd speed, and accordingly the pattern ④ is not selected. From now on, the engagement/release patterns for the individual speed stages are likewise selected.

The forward 3rd speed is set by selecting the pattern of the column c, i.e., by engaging the first clutch means K1, the third clutch means K3, the fourth clutch means K4 and the first brake means B1. Therefore, the 3rd speed is shifted from the 2nd speed stage by switching the engagement/release states of the third clutch means K3 and the third brake means B3, i.e., by engaging the former and releasing latter. In this case, the fourth clutch means K4 can be released but is engaged in advance in case of either of the shifts between the 3rd speed and the 2nd and 4th speeds. The forward 4th speed is set by selecting the pattern ① of the column a, i.e., by engaging not only the second to fourth clutch means K2 to K4 but also the first clutch means K1 or the fifth clutch means K5. In case of an upshift from or a downshift to the 3rd speed, the pattern is established by engaging the first clutch means K1 and releasing the fifth clutch means K5 so that the shift may be executed by switching the engagement/release states of the two frictional engagement means of the second clutch means K2 and the first brake means B1. In case of an upshift to or downshift from the 5th speed, on the other hand, the pattern is established by releasing the first clutch means K1 and engaging the fifth clutch means K5 so that the shift may be executed by switching the engagement/release stages of the two frictional engagement means of the fourth clutch means K4 and the third brake means B3. The forward 5th speed is set by selecting the pattern of the column a to engage the second and third clutch means K2 and K3 and the fifth clutch means K5 and the third brake means B3. The shifts to and from the 4th speed can be executed, if according to this engagement/release pattern, by switching the engagement/release states of the two frictional engagement means. Incidentally, the fifth clutch means K5 could be released at the forward 5th speed. Then, the first planetary gear set 1 and the third planetary gear set 3 would not be mechanically restricted in the so-called "closed chain", thus raising a problem. At the same time, the revolving fluctuations at the shifting time would be unsteady to raise another problem in the control. Hence, the fifth clutch means K5 is engaged in advance execution of the shift at the latest. On the other hand, the reverse stage is set by selecting the pattern ① of the column a to engage the third and fourth clutch means K3 and K4 and the first and second brake means B1 and B2. This considers the case in which the shift between the drive range (i.e., D-range) for setting the forward stages and the reverse range (i.e., R-range) for setting the reverse stage may be relatively rapidly executed in the manual manner. By setting the reverse stage by selecting the pattern ① of the column a of Table 1, the shift between the forward 1st speed and the reverse stage can be achieved by switching the engagement/release states of the two frictional engagement means of the first clutch means K1 and the third clutch means K3. Incidentally, the first brake means B1 may be released at the reverse stage but is engaged prior to execution of the shift. On the other hand, the fifth clutch means K5 can be engaged in advance.

If the plural kinds of engagement/release patterns of the frictional engagement means for setting the major speed stages are selected according to Table 2, as has been described hereinbefore, the shifts can be executed by switching the engagement/release states of the two frictional engagement means no matter whether they might belong to the upshifts or downshifts, so that their timings can be easily set with little deviation. As a result, the shifting operations can be accomplished by the control system which has small shift shocks but can facilitate the shift control with the simple structure.

In the example tabulated in Table 3, the forward 2nd speed is set by selecting the pattern ② of the column b of Table 1, and the other speed stages are set according to those like the aforementioned patterns of Table 2. Since the pattern ② of the column b of the 2nd speed can engage not only the first clutch means K1, the first brake means B1 and the fourth brake means B4 but also the fourth clutch means K4 and the third brake means B3, if necessary, what is different from the pattern ① resides only in that the engagement/release states of the third brake means B3 and the fourth brake means B4 are reversed, if the fourth clutch means K4 is also engaged. As a result, the third brake means B3 and the fourth brake means B4 are released for both the forward 1st and 3rd speeds. Even if, therefore, the forward 2nd speed is to be set according to the pattern ② of the column b, it is possible like the foregoing examples to perform a shift in which two or less frictional engagement means may be easily switched with small shift shocks.

In the example of Table 4, the forward 4th speed is set according to not only the aforementioned pattern ① of the column a but also the pattern ② of the column a of Table 1. According to this pattern ②, the fourth clutch means K4 of the five clutch means may be released. Since, therefore, the fourth clutch means K4 is released at the 5th speed, the shift between the 4th speed and the 5th speed can be achieved by switching the two frictional engagement means of the first clutch means K1 and the third brake means B3. If, in this case, the pattern ② is compared with the pattern ① of the column a in which the first clutch means K1 is also engaged, the engagement/release states of the fourth clutch means K4 and the fifth clutch means K5 are reversed from each other. It is, therefore, preferable to set the steady state, in which the shift at the forward 4th speed is not scheduled, according to the pattern in which all the clutch means are engaged.

In the example of Table 5, the pattern ② of the column a is added to that for the 4th speed of the aforementioned example of Table 3. Like the aforementioned individual examples, the example of Table 5 can provide a shift control which has a small number of frictional engagement means to be switched for the shift so that it is advantageous in the reduction in the shift shocks and in the feasibility of control.

In the example of Table 6, the pattern ① of the column a of the forward 4th speed of those of the aforementioned example of Table 4 is replaced by the pattern ④. According to this pattern ④ of the column a of the forward 4th speed, the second clutch means K2 of the five clutch means may be released, and this release is continued at the 3rd speed. As a result, the shift of excellent controllability like the aforementioned examples can be performed even if it is controlled according to Table 6.

In the example of Table 7, the pattern ① of the column a at the forward 4th speed of the aforementioned example of Table 5 is replaced by the pattern ④.

In the example of Table 8, the pattern ② of the column a at the forward 4th speed of the aforementioned example of Table 6 is replaced by the pattern ①.

In the example of Table 9, the pattern ② of the column a at the forward 4th speed of the aforementioned example of Table 7 is replaced by the pattern ①.

It has been described hereinbefore that the patterns ① and ② of the column a at the forward 4th speed can be interchanged. In any of the examples of Tables 7 to 9, excellent controllable shifts with small shift shocks can be performed like the aforementioned individual examples.

Figure 5:
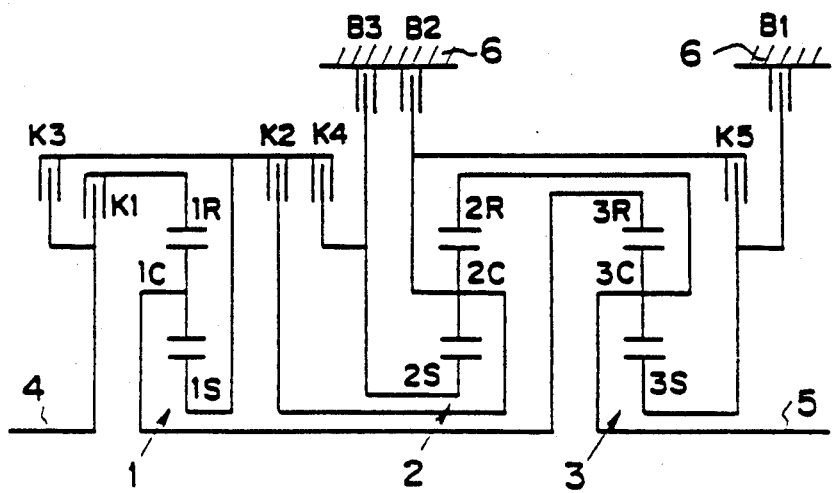
FIGS. 5 to 20 are skeleton diagrams showing other examples of the gear train.
Figure 6:
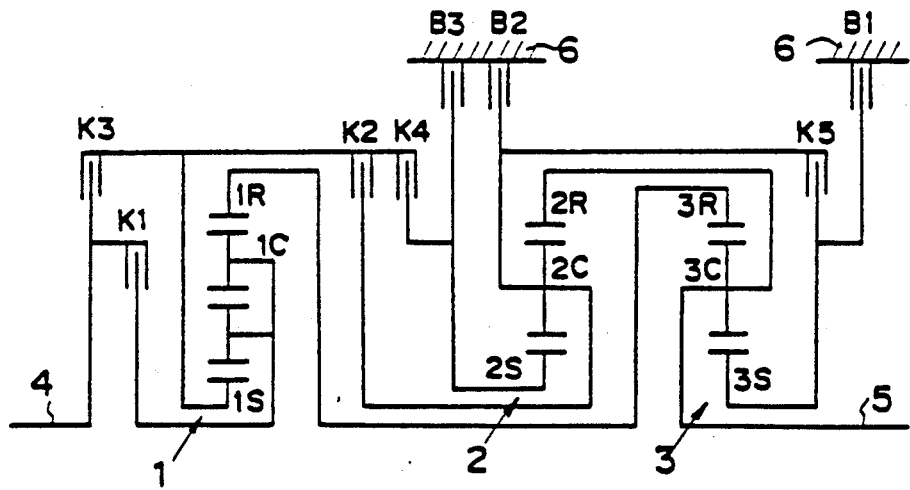

As could be understood from Table 1, the fourth brake means B4 is engaged only at the forward 2nd and 2.5th speeds but is released at the other speed stages, and the 2nd and 2.5th speeds could be set even if the fourth brake means B4 were released. As a result, even the automatic transmission, which is constructed by eliminating the fourth brake means B4 from the structure shown in FIGS. 2 or 3, can perform the controls similar to the aforementioned shift controls. This automatic transmission is exemplified only for references in skeleton diagrams in FIGS. 5 and 6. Specifically, the example shown in FIG. 5 is modified from the structure of FIG. 2 by eliminating the fourth brake means B4, and the example shown in FIG. 6 is modified from the structure of FIG. 3 by eliminating the fourth brake means B4. If, moreover, the method of the present invention is executed for the application to the automatic transmission thus constructed, the shifts of the major speed stages can be performed with excellent controllability but small shift shocks. If the subject of the application is the automatic transmission shown in FIGS. 5 or 6, the fourth brake means B4 does not belong to the automatic transmission. Therefore, the shifts to be performed will follow those of the examples of Tables 2 to 9, in which the fourth brake means B4 is not engaged at any of the speed stages, namely, according to Tables 2, 4, 6 and 8.

The control system and method of the present invention have their gist in that an engagement/release one of a plurality of combinatorial patterns of the engagement/release of the frictional engagement means for setting a predetermined speed stage is selected to restrict the number of the frictional engagement means having their engagement/release states switched at the time of a shift from a speed stage under consideration to another, to two or less. Therefore, the automatic transmission, to which the present invention can be applied, should not be restricted to the structures having the aforementioned gear train but others, as will be described in the following.

Figure 7:
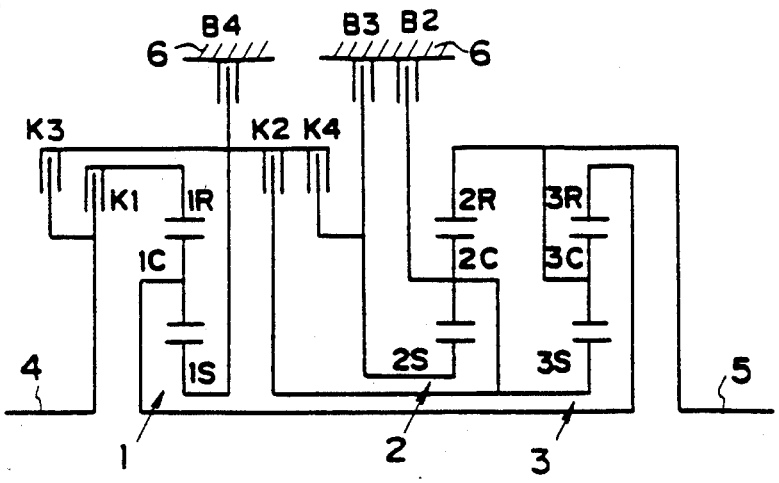

An example shown in FIG. 7 is modified from the aforementioned structure shown in FIG. 2, by eliminating the fifth clutch means K5 between the carrier 2c of the second planetary gear set 2 and the sun gear 3S of the third planetary gear set 3 to connect the carrier 2C and the sun gear 3S at all times and accordingly by eliminating the first brake means B1. The remaining fundamental structure (e.g., the connections) is left similar to that shown in FIG. 2.

Figure 8:
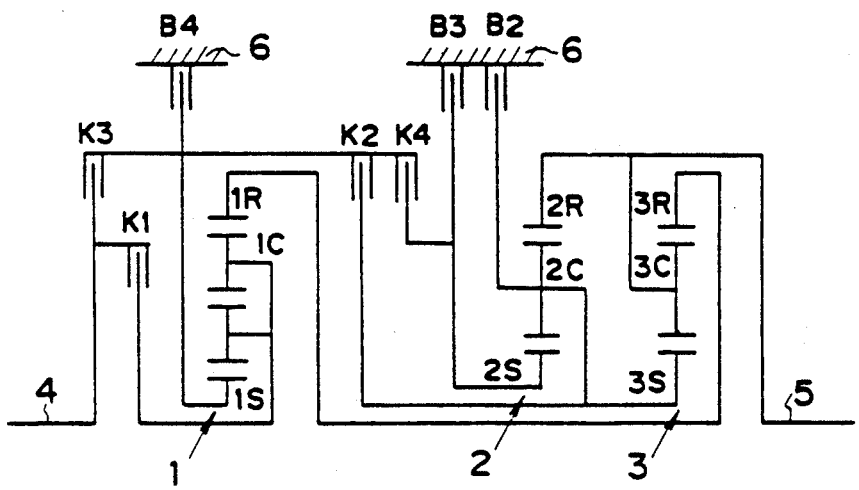

On the other hand, an example shown in FIG. 8 is modified from the aforementioned structure shown in FIG. 3, by eliminating the fifth clutch means K5 between the carrier 2c of the second planetary gear set 2 and the sun gear 3S of the third planetary gear set 3 to connect the carrier 2C and the sun gear 3S at all times and accordingly by eliminating the first brake means B1. The remaining fundamental structure (e.g., the connections) is left similar to that shown in FIG. 3.

Figure 9:
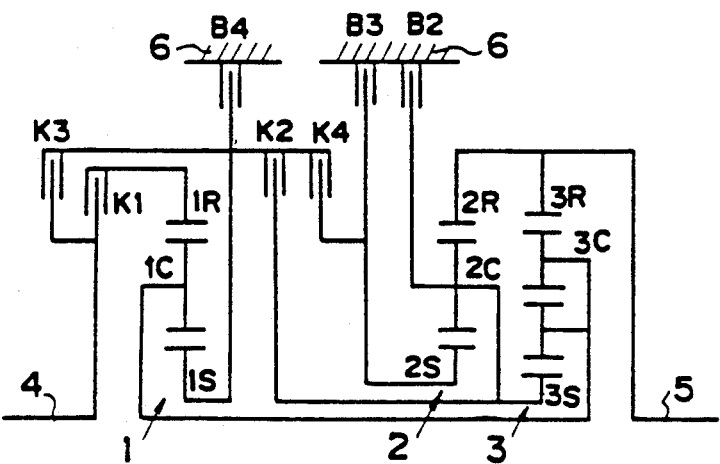

An example shown in FIG. 9 is modified from the aforementioned structure shown in FIG. 7, by changing the third planetary gear set 3 into a double pinion type planetary gear set and accordingly by connecting the ring gear 3R of the third planetary gear set 3 to the ring gear 2R of the second planetary gear set 2 and the output shaft 5 and connecting the carrier 1C of the first planetary gear set 1 to the carrier 3C of the third planetary gear set 3. The remaining fundamental structure (e.g., the connections) is left similar to that shown in FIG. 7.

Figure 10:
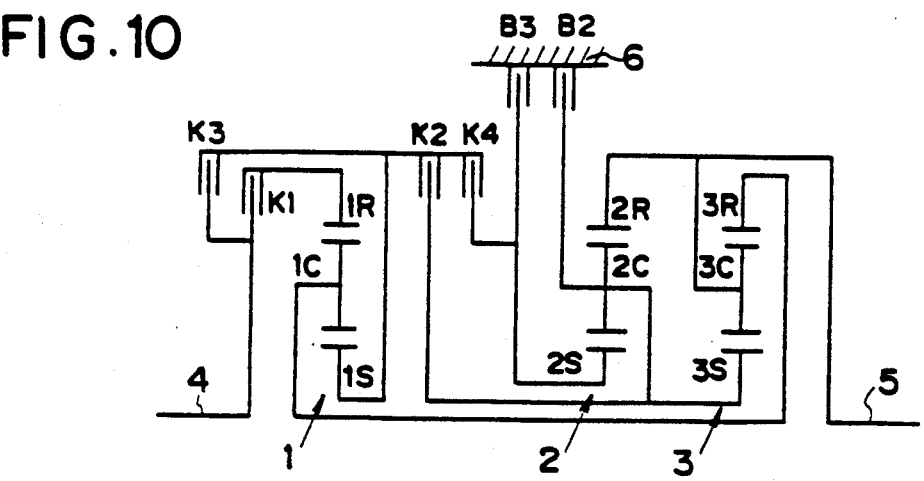

An example shown in FIG. 10 is modified from the aforementioned structure shown in FIG. 5, by eliminating the fifth clutch means K5 between the carrier 2c of the second planetary gear set 2 and the sun gear 3S of the third planetary gear set 3 to connect the carrier 2C and the sun gear 3S at all times and accordingly by eliminating the first brake means B1. The remaining fundamental structure (e.g., the connections) is left similar to that shown in FIG. 5.

Figure 11:
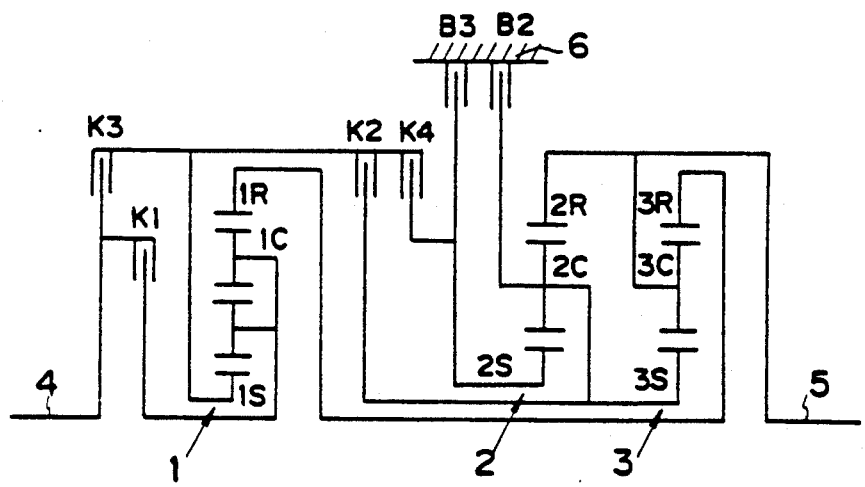

On the other hand, an example shown in FIG. 11 is modified from the aforementioned structure shown in FIG. 6, by eliminating the fifth clutch means K5 between the carrier 2c of the second planetary gear set 2 and the sun gear 3S of the third planetary gear set 3 to connect the carrier 2C and the sun gear 3S at all times and accordingly by eliminating the first brake means B1. The remaining fundamental structure (e.g., the connections) is left similar to that shown in FIG. 6.

Figure 12:
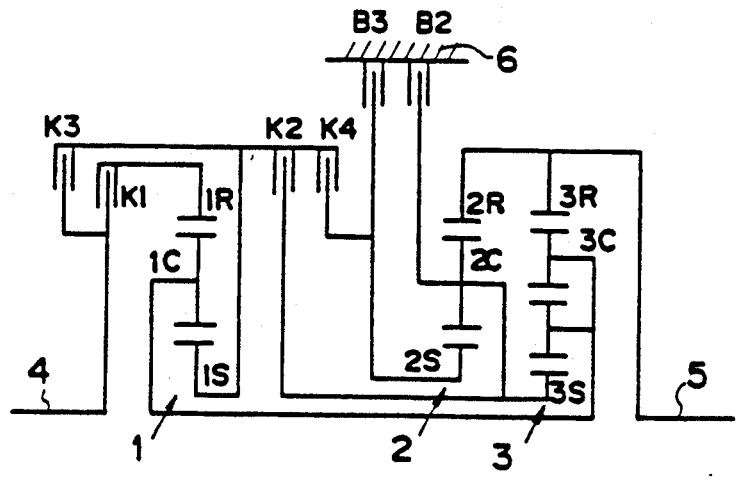

An example shown in FIG. 12 is modified from the aforementioned structure shown in FIG. 10, by changing the third planetary gear set 3 into a double pinion type planetary gear set and accordingly by connecting the ring gear 3R of the third planetary gear set 3 to the ring gear 2R of the second planetary gear set 2 and the output shaft 5 and connecting the carrier 1C of the first planetary gear set 1 to the carrier 3C of the third planetary gear set 3. The remaining fundamental structure (e.g., the connections) is left similar to that shown in FIG. 10.

The automatic transmission having the structures, as shown in FIGS. 7 to 12, is enabled to have the speed stages enumerated in Table 10 and the engagement/release patterns of the frictional engagement means for setting the speed stages.

TABLE 10

|  |  | Clutch Means | | | | Brake Means | | |
|---|---|---|---|---|---|---|---|---|
|  |  | K1 | K2 | K3 | K4 | B2 | B3 | B4 |
| 1st |  | O |  |  | O | O |  |  |
| 2nd | ① | O | O |  |  | O |  | * |
|  | ② | O | O |  |  | * |  | O |
|  | ③ | O | * |  |  | O |  | O |
| 2.5th | ① | O |  |  | O |  | O | * |
|  | ② | O |  |  | O |  | * | O |
|  | ③ | O |  |  | * |  | O | O |
| 3rd |  | O |  | O |  | O |  |  |
| 3.2th |  | O | O |  |  |  | O |  |
| 3.5th |  | O |  | O |  |  | O |  |
| 4th | ① | O | O | O |  | * |  |  |
|  | ② | O | O | * | O |  |  |  |
|  | ③ | O | * | O | O |  |  |  |
|  | ④ | * | O | O | O |  |  |  |
| 5th |  |  | O | O |  |  | O |  |
| Rev |  |  | O | O | O |  |  |  |

When shifts for setting the major speed stages of the forward five and one reverse speeds are to be executed, the engagement/release patterns are selected to have two or less frictional engagement means having their engagement/release states changed and to have as small fluctuations in the numbers of revolution of revolving components as possible, as exemplified in Table 11 or 12. Incidentally, a shift control according to Table 11 can be applied to an automatic transmission from which the fourth brake means B4 is eliminated (as shown in FIGS. 10 to 12), and a shift control according to any of Tables 11 and 12 can be applied to an automatic transmission which is equipped with the fourth brake means B4 (as shown in FIGS. 7 to 9).

TABLE 11

|  |  | Clutch Means | | | | Brake Means | | |
| --- | --- | --- | --- | --- | --- | --- | --- | --- |
|  |  | K1 | K2 | K3 | K4 | B2 | B3 | B4 |
| 1st |  |  | ○ |  |  | ○ | ○ |  |
| 2nd | ① |  | ○ | ○ |  | ○ | △ |  |
| 3rd |  |  | ○ |  | ○ | ○ |  |  |
| 4th | ① |  | ○ | ○ | ○ |  | △ |  |
| 5th |  |  |  | ○ | ○ |  |  | ○ |
| Rev |  |  |  |  | ○ | ○ | ○ | ○ |

TABLE 12

|  |  | Clutch Means | | | | Brake Means | | |
| --- | --- | --- | --- | --- | --- | --- | --- | --- |
|  |  | K1 | K2 | K3 | K4 | B2 | B3 | B4 |
| 1st |  |  | ○ |  |  | ○ | ○ |  |
| 2nd | ③ |  | ○ | △ |  | ○ |  | ○ |
| 3rd |  |  | ○ |  | ○ | ○ |  |  |
| 4th | ① |  | ○ | ○ | ○ | △ |  |  |
| 5th |  |  |  | ○ | ○ |  | ○ |  |
| Rev |  |  |  |  | ○ | ○ | ○ | ○ |

Here will be described the reason for selecting the forward 4th speed according to the pattern ① of the column a by the shift control methods exemplified in Tables 11 and 12. The two patterns ① and ③ of the column a of the 4th speed are found as the pattern in which two or less frictional engagement means are to have their engagement/release states switched for the shifts between the forward 3rd and 4th speeds. On the other hand, the patterns, in which two or less frictional engagement means are to be switched for the shifts between the 4th and 5th speeds, are the patterns ① and ④ of the column a of the forward 4th speed. The pattern ① is preferable because it is advantageously used common for the upshift and downshift. Incidentally, there arises no trouble even if the 4th speed is set according to the pattern ③ of the column a. Another patterns, in which all the clutch means are engaged for the forward 4th speed, can also be used, as has been described in the foregoing embodiments. In case these patterns are used, the shifts can be executed by way of the engagement/release patterns other than the pattern ① of the column a of the forward 4th speed.

Figure 13:
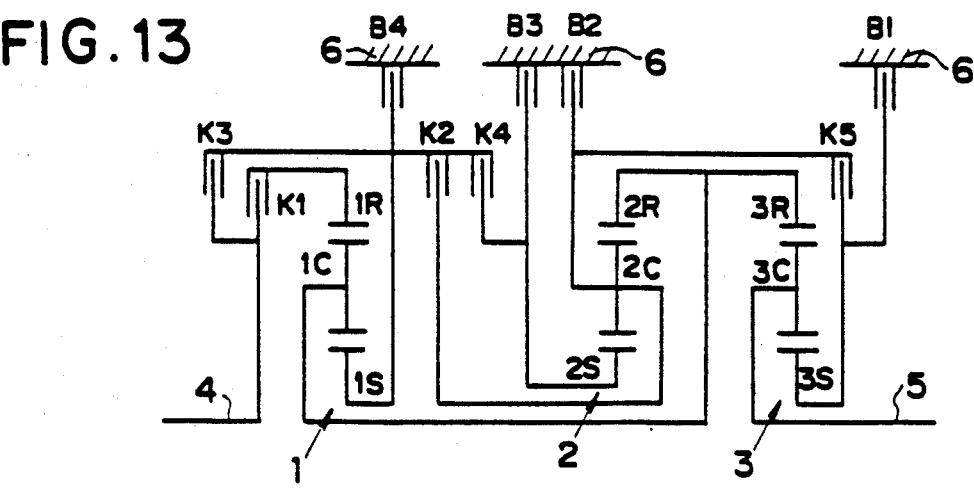

FIGS. 13 to 18 show still other structures of the automatic transmission, to which the method of the present invention can be applied. The example shown in FIG. 13 is modified from the foregoing structure of FIG. 2 by connecting the ring gear 2R of the second planetary gear set 2 not to the carrier 3C of the third planetary gear set 3 but to the ring gear 3R of the third planetary gear set 3 and accordingly by connecting the carrier 1C of the first planetary gear set 1 to the ring gear 2R of the second planetary gear set 2 and the ring gear 3R of the third planetary gear set 3. The remaining structure is left similar to that shown in FIG. 2.

Figure 14:
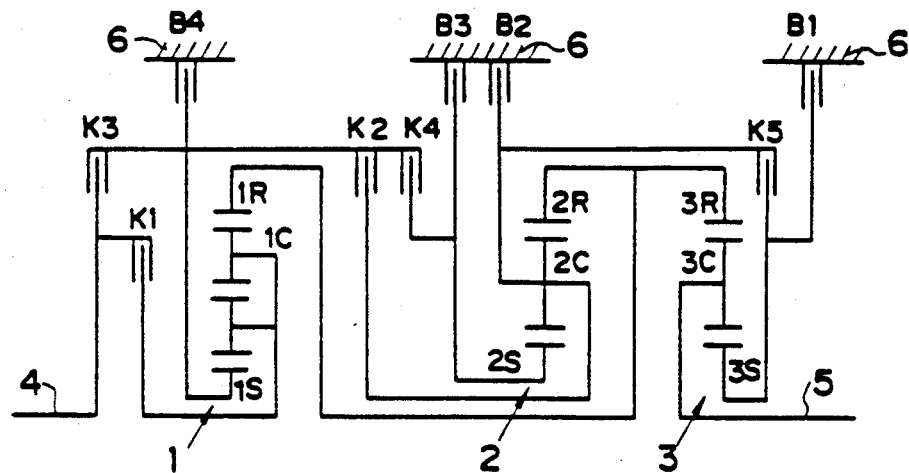

On the other hand, the example shown in FIG. 14 is modified from the aforementioned structure of FIG. 13 by changing the first planetary gear set 1 into a double pinion type planetary gear set and accordingly by connecting the ring gear 1R of the first planetary gear set 1 to the ring gears 2R and 3R of the second planetary gear set 2 and the third planetary gear set 3 and connecting the carrier 1C of the first planetary gear set 1 selectively to the input shaft 4 through the first clutch means K1. The remaining structure is left similar to that shown in FIG. 13.

Figure 15:
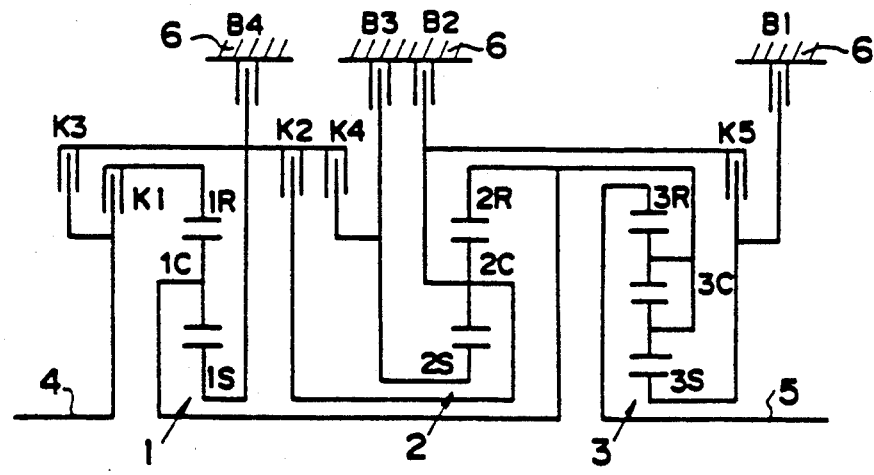

The example shown in FIG. 15 is modified from the aforementioned structure of FIG. 13 by changing the third planetary gear set 3 into a double pinion type planetary gear set and accordingly by connecting the carrier 3C of the third planetary gear set 3 to the ring gear 2R of the second planetary gear set 2 and connecting the ring gear 3R of the third planetary gear set 3 to the output shaft 5. The remaining structure is left similar to that shown in FIG. 13.

Figure 16:
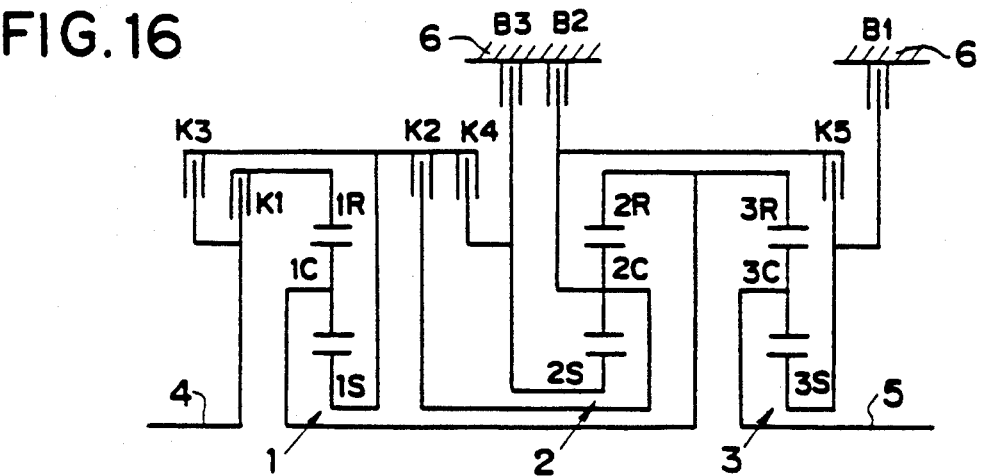
Figure 17:
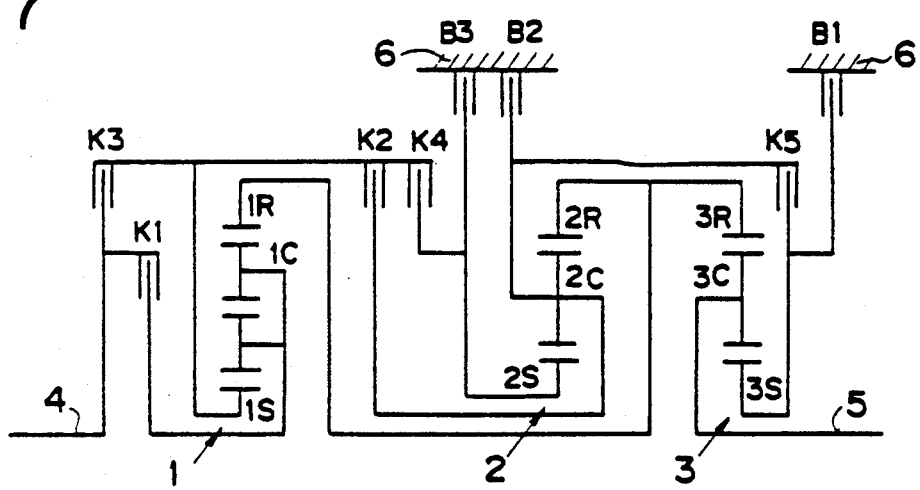
Figure 18:
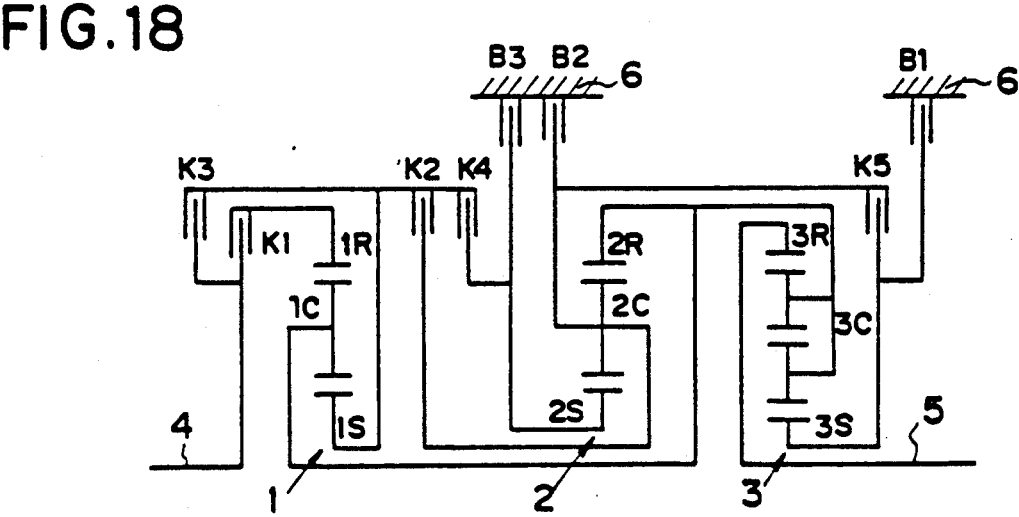

Moreover, the example shown in FIG. 16 is modified from the structure of FIG. 13 by eliminating the fourth brake means B4. Likewise, the example shown in FIG. 17 is modified from the structure of FIG. 14 by eliminating the fourth brake means B4, and the example shown in FIG. 18 is modified from the structure of FIG. 15 by eliminating the fourth brake means B4.

These automatic transmission having the structures, as shown in FIGS. 13 to 18, are enabled to adopt both the speed stages of Table 13 and the engagement/release patterns of the frictional engagement means for setting the speed stages.

TABLE 13

|  |  |  | Clutch Means | | | | | Brake Means | | | |
| --- | --- | --- | --- | --- | --- | --- | --- | --- | --- | --- | --- |
|  |  |  | K1 | K2 | K3 | K4 | K5 | B1 | B2 | B3 | B4 |
| 1st | | ① | ○ |  |  | ○ | ○ | ○ | * |  |  |
| | | ② | ○ |  |  | ○ | ○ | * | ○ |  |  |
| | | ③ | ○ |  |  | ○ | * | ○ | ○ |  |  |
| 2nd | a | ① | ○ | ○ |  |  | ○ | ○ | * |  | * |
| | | ② | ○ | ○ |  |  | ○ | * | ○ |  | * |
| | | ③ | ○ | ○ |  |  | ○ | * | * |  | ○ |
| | | ④ | ○ | ○ |  |  | * | ○ | ○ |  | * |
| | | ⑤ | ○ | * |  |  | * | ○ | * |  | ○ |
| | | ⑥ | ○ | * |  |  | ○ | * | ○ |  | ○ |
| | b | ① | ○ |  |  | ○ |  | ○ |  | ○ | * |
| | | ② | ○ |  |  | * |  | ○ |  | ○ | ○ |
| 2.2th | | | ○ | ○ |  |  |  | ○ |  | ○ |  |
| 2.5th | | ① | ○ |  |  | ○ | ○ |  |  | ○ | * |
| | | ② | ○ |  |  | ○ | ○ |  |  | * | ○ |
| | | ③ | ○ |  |  | * | ○ |  |  | ○ | ○ |
| 3rd | a | ① | ○ | ○ |  | ○ |  | * | ○ | * |  |
| | | ② | ○ | ○ |  | ○ |  | ○ | * | ○ |  |
| | b | | ○ | ○ |  | ○ |  | ○ |  | * |  |
| | c | ① | ○ | * |  | ○ | * | ○ |  |  |  |
| | | ② | ○ | ○ | * | ○ |  | ○ |  |  |  |
| | | ③ | * | ○ | ○ | ○ |  | ○ |  |  |  |
| 3.2th | | | ○ | ○ |  | ○ |  | ○ |  | ○ |  |
| 3.5th | | | ○ | ○ |  | ○ |  | ○ |  | ○ |  |
| 4th | | ① | ○ | ○ | ○ | * | ○ | ○ |  |  |  |
| | | ② | ○ | ○ | * | ○ | ○ | ○ |  |  |  |
| | | ③ | ○ | * | ○ | ○ | ○ | ○ |  |  |  |
| | | ④ | * | ○ | ○ | ○ | ○ | ○ |  |  |  |
| 4.5th | | | | | ○ | ○ | ○ |  |  | ○ |  |
| 5th | | | | | ○ | ○ | ○ |  |  | ○ |  |
| Rev | | ① |  |  | ○ | ○ | ○ | ○ | * |  |  |
| | | ② |  |  | ○ | ○ | ○ | * | ○ |  |  |
| | | ③ |  |  | ○ | ○ | * | ○ | ○ |  |  |

When shifts for setting the major speed stages of the forward five and one reverse speeds are to be executed, the engagement/release patterns are selected to have two or less frictional engagement means having their engagement/release states changed and to have as small fluctuations in the numbers of revolution of revolving components as possible, as exemplified in Table 14 or 23. Incidentally, a shift control according to Tables 14, 16, 18, 20 and 22 can be applied to an automatic transmission from which the fourth brake means B4 is eliminated (as shown in FIGS. 16 to 18), and a shift control according to any of Tables 14 and 23 can be applied to an automatic transmission which is equipped with the fourth brake means B4 (as shown in FIGS. 13 to 15).

TABLE 14

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | O | | | O | △ | O | O | | |
| 2nd | b | ① | O | | | O | | O | | O | △ |
| 3rd | c | ① | O | △ | O | ⊙ | | O | | | |
| 4th | | ③ | O | ⊙ | O | O | O | | | | |
| | | ④ | △ | O | O | O | O | | | | |
| 5th | | | | | O | | | O | | | O |
| Rev | | ③ | | | O | O | △ | O | O | | |

TABLE 15

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | O | | | O | △ | O | O | | |
| 2nd | b | ② | O | | | ⊙ | | O | | △ | O |
| 3rd | c | ① | O | △ | O | ⊙ | | O | | | |
| 4th | | ③ | O | ⊙ | O | O | O | | | | |
| | | ④ | △ | O | O | O | O | | | | |
| 5th | | | | | O | | | O | | | O |
| Rev | | ③ | | | O | O | △ | O | O | | |

TABLE 16

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | O | | | O | △ | O | O | | |
| 2nd | b | ① | O | | | O | | O | | O | △ |
| 3rd | c | ① | O | △ | O | ⊙ | | O | | | |
| 4th | | ③ | O | ⊙ | O | O | O | | | | |
| | | ① | O | O | O | △ | O | | | | |
| 5th | | | | | O | | | O | | | O |
| Rev | | ③ | | | O | O | △ | O | O | | |

TABLE 17

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | O | | | O | △ | O | O | | |
| 2nd | b | ② | O | | | ⊙ | | O | | △ | O |
| 3rd | c | ① | O | △ | O | ⊙ | | O | | | |
| 4th | | ③ | O | ⊙ | O | O | O | | | | |
| | | ① | O | O | O | △ | O | | | | |
| 5th | | | | | O | | | O | | | O |
| Rev | | ③ | | | O | O | △ | O | O | | |

TABLE 18

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | O | | | O | △ | O | O | | |
| 2nd | b | ① | O | | | O | | O | | O | △ |
| 3rd | c | ① | O | △ | O | ⊙ | | O | | | |
| | c | ① | O | ⊙ | O | △ | | O | | | |
| 4th | | ① | O | | O | △ | O | | | | |
| 5th | | | | | O | | | O | | | O |
| Rev | | ③ | | | O | O | △ | O | O | | |

TABLE 19

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | O | | | O | △ | O | O | | |
| 2nd | b | ② | O | | | ⊙ | | O | | △ | O |
| 3rd | c | ① | O | △ | O | ⊙ | | O | | | |
| | c | ① | O | ⊙ | O | △ | | O | | | |
| 4th | | ① | O | | O | △ | O | | | | |
| 5th | | | | | O | | | O | | | O |
| Rev | | ③ | | | O | O | △ | O | O | | |

TABLE 20

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | O | | | O | △ | O | O | | |
| 2nd | b | ① | O | | | O | | O | | O | △ |
| 3rd | c | ② | O | O | △ | O | | O | | | |
| 4th | | ② | O | O | ⊙ | O | O | | | | |
| | | ① | O | O | O | △ | O | | | | |
| 5th | | | | | O | | | O | | | O |
| Rev | | ③ | | | O | O | △ | O | O | | |

TABLE 21

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | O | | | O | △ | O | O | | |
| 2nd | b | ② | O | | | ⊙ | | O | | △ | O |
| 3rd | c | ② | O | O | △ | O | | O | | | |
| 4th | | ② | O | O | ⊙ | O | O | | | | |
| | | ① | O | O | O | △ | O | | | | |
| 5th | | | | | O | | | O | | | O |
| Rev | | ③ | | | O | O | △ | O | O | | |

TABLE 22

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | O | | | O | △ | O | O | | |
| 2nd | b | ① | O | | | O | | O | | O | △ |
| 3rd | c | ② | O | O | △ | O | | O | | | |
| 4th | | ② | O | O | ⊙ | O | O | | | | |
| | | ④ | △ | O | O | O | O | | | | |
| 5th | | | | | O | | | O | | | O |
| Rev | | ③ | | | O | O | △ | O | O | | |

TABLE 23

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | O | | | O | △ | O | O | | |
| 2nd | b | ① | O | | | ⊙ | | O | | △ | O |
| 3rd | c | ② | O | O | △ | O | | O | | | |
| 4th | | ② | O | O | ⊙ | O | O | | | | |
| | | ④ | △ | O | O | O | O | | | | |
| 5th | | | | | O | | | O | | | O |
| Rev | | ③ | | | O | O | △ | O | O | | |

In the shift control according to Table 14, the forward 1st speed is set by engaging (according to the pattern ③) the first clutch means K1, the fourth clutch means K4, the first brake means B1 and the second brake means B2. In this case, the fifth clutch means K5 can be engaged but is released before execution of the shift. The forward 2nd speed is set by engaging (according to the pattern ① of the column b) the first clutch means K1, the fourth clutch means K4, the first brake means B1, the second brake means B2 and the third brake means B3. In this case, too, the fourth brake means B4 can be engaged but is released before execution of the shift. As a result, the shifts between the 1st speed and the 2nd speed can be achieved by switching the engagement/release states of the two frictional engagement means of the second brake means B2 and the third brake means B3. The 3rd speed is set by engaging (according to the pattern ① of the column c) the first clutch means K1, the third clutch means K3 and the first brake means B1. In this case, the second clutch means K2 may be engaged but is released before execution of the shift, and the fourth clutch means K4 may be released but is engaged before execution of the shift. As a result, the shifts between the 2nd speed and the 3rd speed can be achieved by switching the engagement-/release states of the two frictional engagement means of the third clutch means K3 and the third brake means B3. The forward 4th speed is set according to the patterns ③ and ④. In case a shift from the 3rd speed is to be accomplished, there is selected the pattern in which the clutch means other than the second clutch means K2 are engaged, so that the shift may be achieved by switching the engagement/release states of the two frictional engagement means of the fifth clutch means K5 and the first brake means B1. In case of the upshift, the second clutch means K2 is engaged prior to the shift, and the pattern ④ is followed from this state to release the first clutch means K1. Moreover, the forward 5th speed is set by engaging the second, third and fifth clutch means K2, K3 and K5 and the third brake means B3. As a result, the shifts between the 4th speed and the 5th speed can be achieved by switching the engagement/release states of the fourth clutch means K4 and the third brake means B3. On the other hand, the reverse stage is set by engaging (according to the pattern ③) the third and fourth clutch means K3 and K4 and the first and second brake means B1 and B2. In this case, the fifth clutch means K5 may be engaged but is released prior to the shift. As a result, the shift between the 1st speed and the reverse stage can be achieved by switching the engagement/release states of the two frictional engagement means of the first clutch means K1 and the third clutch means K3.

By thus accomplishing the shifts, the shifts are with small shift shocks but excellent controllability.

In the example exemplified in Table 15, the forward 2nd speed of the example of Table 14 is set by selecting the pattern ② of the column b. In this case, the fourth clutch means K4 may be released but is engaged at the time of the shift. Then, what is different between the patterns ① and ② of the column b of the 2nd speed resides only in that the engagement/release states of the third brake means B3 and the fourth brake means B4 to be released at either of the forward 1st and 3rd speeds are reversed. As a result, excellently controllable shifts can be achieved like the case according to Table 14.

In the example exemplified in Table 16, the pattern ④ of the forward 4th speed in the aforementioned example of Table 14 is replaced by the pattern ①. What is different between the patterns ④ and ① resides in that the engagement/release states of the first clutch means K1 and the fourth clutch means K4 are reversed from each other. Since, however, these clutch means are released at the 5th speed, even the shift control according to Table 16 can be achieved like the aforementioned case according to Table 14.

In the example exemplified in Table 17, the pattern ④ of the forward 4th speed in the aforementioned example of Table 15 is replaced by the pattern ①, and this change can be made, as has been described hereinbefore.

The example exemplified in Table 18 is modified from the aforementioned example of Table 14 by switching and setting two kinds of the pattern ① of the column c of Table 13 as that for setting the forward 3rd speed and by setting the forward 4th speed according to the pattern ①. Specifically, the pattern ① of the column c of the 3rd speed requires the engagements among the first clutch means K1, the third clutch means K3 and the first brake means B1 and the engagement, if necessary, between the second clutch means K2 and the fourth clutch means K4. For the shift with the 2nd speed, therefore, there is adopted the pattern in which the first clutch means K1, the third clutch means K3, the fourth clutch means K4 and the first brake means B1 are engaged. For the shift with the 4th speed, on the other hand, there is selected the pattern in which the first to third clutch means K1, K2 and K3 and the first brake means B1 are engaged. For the forward 4th speed, moreover, the pattern ① is adopted. Even this shift control method can effect the shifts by switching the engagement/release states of the two frictional engagement means, as could be understood from Table 18.

In the example exemplified in Table 19, the forward 2nd speed of the aforementioned example of Table 18 is set by selecting the pattern ② of the column b, and the remaining speed stages are set like Table 18.

In the example exemplified in Table 20, the pattern ② of the column c is selected as the pattern for setting the forward 3rd speed of the aforementioned example of Table 16. This engagement/release pattern requires the engagements of the first clutch means K1, the second clutch means K2, the fourth clutch means K4 and the first brake means B1 and is different from the pattern ① of the column b of the 2nd speed in that the engagement/release states of the second clutch means K2 and the third brake means B3 are reversed. As a result, the shifts can be effected by switching those two frictional engagement means. Moreover, what is different from the forward 4th speed for which all the clutch means are engaged is that the engagement/release states of the third clutch means K3 and the first brake means B1 are reserved. As a result, the shifts between the 3rd speed and the 4th speed can be achieved by switching those two frictional engagement means.

The example exemplified in Table 21 is modified from the aforementioned example of Table 20 by changing the pattern for setting the forward 2nd speed from ① to ②.

The example exemplified in Table 22 is modified from the example of Table 20 by setting the state of the 4th speed, which is to be set prior to the shift to the 5th speed, according to the pattern ④.

Moreover, the example exemplified in Table 23 is modified from the example of Table 21 by setting the state of the 4th speed, which is to be set prior to the shift to the 5th speed, according to the pattern ④.

It has been described hereinbefore that the pattern ④ can be selected at the 4th speed.

Figure 19:
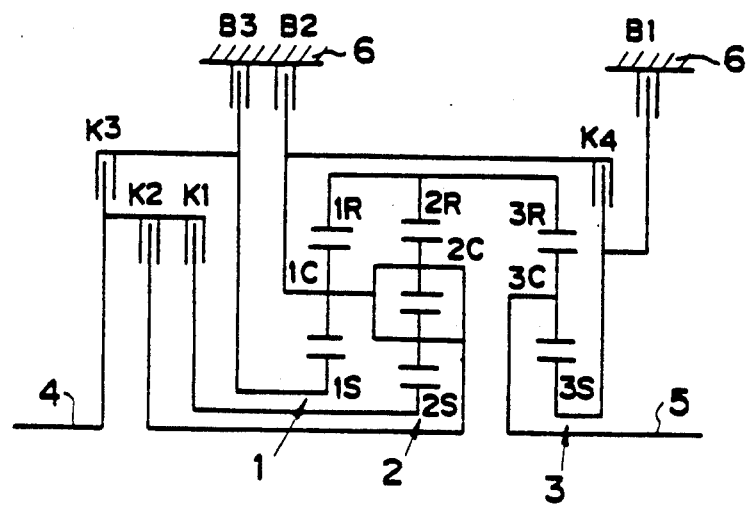

The automatic transmission, to which the present invention can be applied, and the method of the present invention for the subject of the automatic transmission will be described in the following in connection with their embodiments. The automatic transmission is constructed, as shown in FIG. 19, to use a single pinion type planetary gear set as the first and third planetary gear sets 1 and 3 and a double pinion type planetary gear set as the second planetary gear set 2. The individual ring gears 1R, 2R and 3R are connected to revolve altogether, and the carrier 1C of the first planetary gear set 1 and the carrier 2C of the second planetary gear set 2 are connected to each other and further to the sun gear 3S of the third planetary gear set 3 through the fourth clutch means K4. The first clutch means K1 is interposed between the input shaft 4 and the sun gear 2S of the second planetary gear set 2. The second clutch means K2 is interposed between the input shaft 4 and the carrier 2C of the second planetary gear set 2. The third clutch means K3 is interposed between the input shaft 4 and the sun gear 1S of the first planetary gear set 1. As the brake means, on the other hand, there are provided: the first brake means B1 for stopping the revolutions of the sun gear 3S of the third planetary gear set 3 selectively; the second brake means B2 for stopping the revolutions of the carriers 1C and 2C of the first planetary gear set 1 and the second planetary gear set 2, which are connected to each other; and the third brake means B3 for stopping the revolutions of the sun gear 1S of the first planetary gear set 1 selectively. Moreover, the output shaft 5 is connected to the carrier 3C of the third planetary gear set 3.

Figure 20:
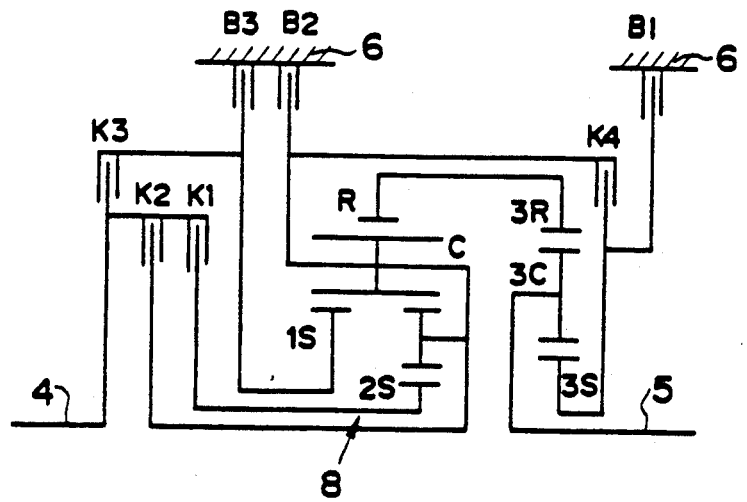

The structure, as shown in FIG. 20, is modified from the aforementioned structure of FIG. 19 by changing the first planetary gear set 1 and the second planetary gear set 2 into a Ravignawx type planetary gear set 8. Specifically, this Ravignawx type planetary gear set 8 is composed of the ring gear R, the first sun gear 1S, the second sun gear 2S, and the carrier C holding both a pinion gear meshing the ring gear R and the first sun gear 1S and another pinion gear meshing with the former pinion gear and the second sun gear 2S. The ring gear R is connected to the ring gear 3R of the third planetary gear set 3. The carrier C is connected to the sun gear 3S of the third planetary gear set 3 through the fourth clutch means K4. The first sun gear 1S is connected to the input shaft 4 through the third clutch means K3. The second sun gear 2S is connected to the input shaft 4 through the second clutch means K2. The carrier C is connected to the input shaft 4 through the first clutch means K1. Moreover, the output shaft 5 is connected to the carrier 3C of the third planetary gear set 3. On the other hand, the brake means is composed of: the first brake means B1 for stopping the revolutions of the sun gear 3S of the third planetary gear set 3 selectively; the second brake means B2 for stopping the revolutions of the carrier C of the Ravignawx planetary gear set 8 selectively; and the third brake means B3 for stopping the revolutions of the aforementioned first sun gear 1S selectively.

The automatic transmissions having the structures shown in FIGS. 19 and 20 are enabled to set the speed stages tabulated in Table 24 and to have the engagement/release patterns of the frictional engagement means for setting those speed stages. According to the method of the present invention, the major speed stages of the forward five and reverse one speeds are set by the selected patterns, as tabulated in Tables 25 to 28.

TABLE 24

|  |  | Clutch Means | | | | Brake Means | | |
| --- | --- | --- | --- | --- | --- | --- | --- | --- |
|  |  | K1 | K2 | K3 | K4 | B1 | B2 | B3 |
| 1st | ① | ○ |  |  |  | ○ | ○ | * |
|  | ② | ○ |  |  |  | ○ | * | ○ |
|  | ③ | ○ |  |  |  | * | ○ | ○ |
| 2nd | ① | ○ |  |  |  | ○ |  | ○ |
| 2.5th |  | ○ |  |  | ○ |  |  | ○ |
| 3rd | ① | ○ | ○ | ○ | * | ○ |  |  |
|  | ② | ○ | * | ○ | ○ | ○ |  |  |
|  | ③ | * | ○ | ○ | ○ | ○ |  |  |
| 4th | ① | ○ | ○ | * | ○ | ○ |  |  |
|  | ② | ○ | * | ○ | ○ | ○ |  |  |
|  | ③ | * | ○ | ○ | ○ | ○ |  |  |
| 4.5t |  |  | ○ |  | ○ |  |  | ○ |
| 5th |  |  | ○ |  | ○ |  |  | ○ |
| Rev | ① |  | ○ | ○ | ○ | * |  |  |
|  | ② |  | ○ | ○ | ○ | * | ○ |  |
|  | ③ |  | ○ | ○ | * | ○ | ○ |  |

TABLE 25

|  |  | Clutch Means | | | | Brake Means | | |
| --- | --- | --- | --- | --- | --- | --- | --- | --- |
|  |  | K1 | K2 | K3 | K4 | B1 | B2 | B3 |
| 1st | ③ | ○ |  |  | △ | ○ | ○ |  |
| 2nd |  | ○ |  |  |  | ○ |  | ○ |
| 3rd | ① | ○ | ○ | △ |  | ○ |  |  |
| 4th | ① | ○ | ○ | △ | ○ |  |  |  |
| 5th |  |  | ○ |  | ○ |  |  | ○ |
| Rev | ③ |  |  | ○ | △ | ○ | ○ |  |

TABLE 26

|  |  | Clutch Means | | | | Brake Means | | |
| --- | --- | --- | --- | --- | --- | --- | --- | --- |
|  |  | K1 | K2 | K3 | K4 | B1 | B2 | B3 |
| 1st | ③ | ○ |  |  | △ | ○ | ○ |  |
| 2nd |  | ○ |  |  |  | ○ |  | ○ |
| 3rd | ① | ○ | ○ | △ |  | ○ |  |  |
| 4th |  | ○ | ○ | ⊙ | ○ |  |  |  |
|  | ③ | △ | ○ | ○ | ○ |  |  |  |
| 5th |  |  | ○ |  | ○ |  |  | ○ |
| Rev | ③ |  |  | ○ | △ | ○ | ○ |  |

TABLE 27

|  |  | Clutch Means | | | | Brake Means | | |
| --- | --- | --- | --- | --- | --- | --- | --- | --- |
|  |  | K1 | K2 | K3 | K4 | B1 | B2 | B3 |
| 1st | ③ | ○ |  |  | △ | ○ | ○ |  |
| 2nd |  | ○ |  |  |  | ○ |  | ○ |
| 3rd | ① | ○ | ○ | △ |  | ○ |  |  |
| 4th |  | ○ | ○ | ⊙ | ○ |  |  |  |
|  | ② | ○ | ○ | △ | ○ |  |  |  |
| 5th |  |  | ○ |  | ○ |  |  | ○ |
| Rev | ③ |  |  | ○ | △ | ○ | ○ |  |

TABLE 28

|  |  | Clutch Means | | | | Brake Means | | |
| --- | --- | --- | --- | --- | --- | --- | --- | --- |
|  |  | K1 | K2 | K3 | K4 | B1 | B2 | B3 |
| 1st | ③ | ○ |  |  | △ | ○ | ○ |  |
| 2nd |  | ○ |  |  |  | ○ |  | ○ |
| 3rd | ② | ○ | △ | ○ |  | ○ |  |  |
| 4th |  | ○ | ○ | ⊙ | ○ |  |  |  |
|  | ③ | △ | ○ | ○ | ○ |  |  |  |
| 5th |  |  | ○ |  | ○ |  |  | ○ |
| Rev | ③ |  |  | ○ | △ | ○ | ○ |  |

As could be understood from Tables 25 to 28, the engagement/release states of the two frictional engagement means may be switched for either of the shifts of the upshift and the downshift so that the shifts can be accomplished with small shift shocks and excellent controllability.

Here, the shift controls according to the aforementioned individual clutch and brake application charts can be executed by the following methods. In one method, the engagement/release patterns of the frictional engagement means for setting the individual speed stages are stored in advance as data so that the data may be called to set the individual speed stages in response to a shift command. In another method, all the engagement/release patterns for the individual speed stages, as exemplified in Table 1, 13 or 24, are stored so that the engagement/release patterns for setting the present speed may be so suitably selected and set in comparison with the engagement/release pattern for a target speed stage in response to the shift command that the number of the frictional engagement means to have their engagement/release states switched for executing the shift may be two or less.

Incidentally, the foregoing individual embodiments have been described in case the shifts are to be accomplished to their adjacent ones. Despite of this description, however, the present invention can be applied to not only the foregoing embodiments but also a case in which the shifts are to be jumped to two or more steps. In the foregoing embodiments, moreover, the automatic transmission to be controlled is shown in the skeleton diagrams so that their clutch means and brake means are symbolically shown in the multiple disc structures. Despite of this illustration, however, the frictional engagement means to be adopted in the automatic transmission for the present invention can be specifically exemplified by the multiple disc structure, the combination with a one-way clutch, or the band brake, as has been disclosed by us in our Japanese Patent Application No. 63-176270 or 63-221670.

Moreover, the structure of the automatic transmission according to the present invention should not be limited to those disclosed in the foregoing individual embodiments. Accordingly, the combinatorial engagement/release patterns of the frictional engagement means to be selected for setting the individual speed stages should not be limited to those specified in the foregoing embodiments but are modified in accordance with the individual structures of the automatic transmission.

As has been apparent from the description thus far made, the central technology of the present invention is to select such an engagement/release pattern as will have two or less frictional engagement means switched in their engagement/release states for a shift. Therefore, this technology should not have its application limited to the shifts while the vehicle is running but can be applied to shifts for preventing the vehicular body from diving when the automatic transmission is set from the neutral state to a predetermined low speed stage.

Figure 21:
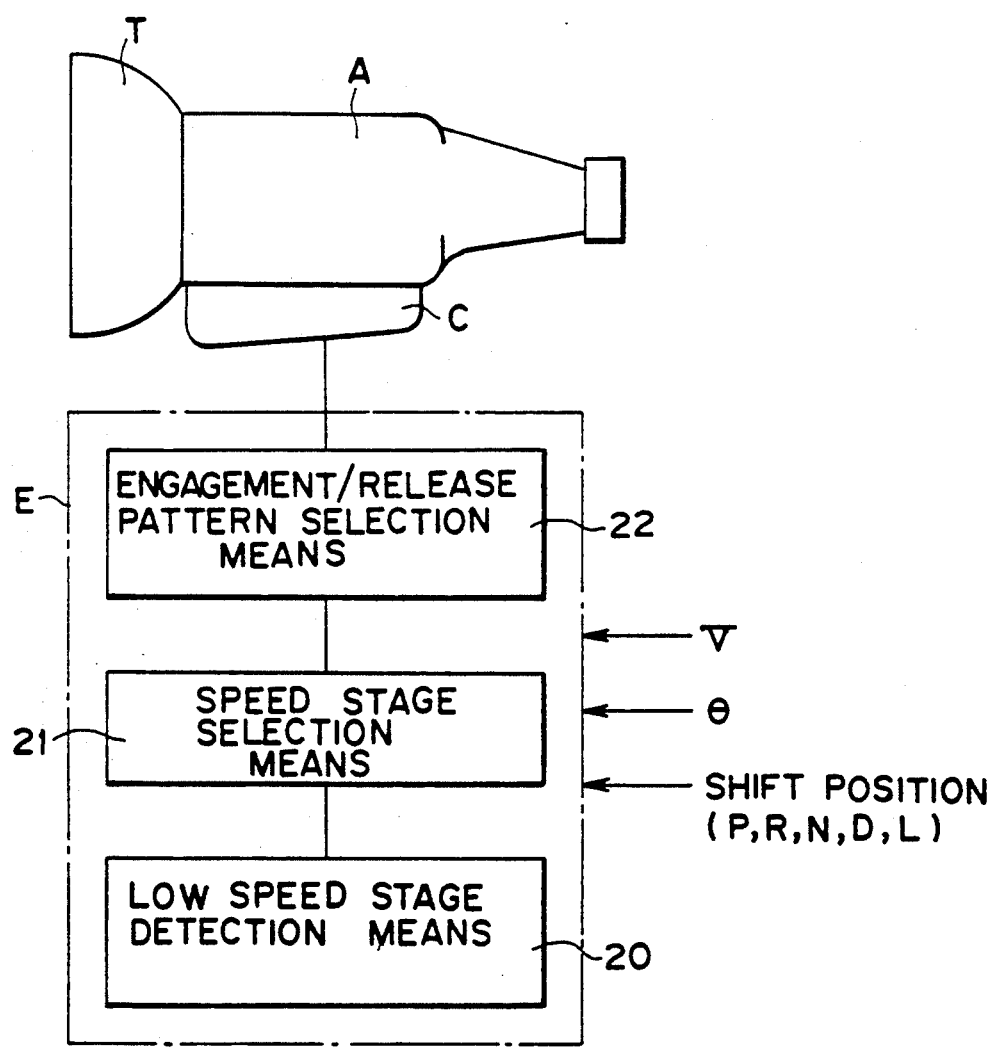
FIG. 21 is a block diagram showing the basic structure of another embodiment of the shift control system.

FIG. 21 is a block diagram showing one example of a system for controlling the shifts.

The automatic transmission A is connected to the (not-shown) engine through the torque converter T and is equipped with any of the aforementioned gear trains, as shown in FIGS. 2, 3 and 5 to 20. As a result, the automatic transmission A has a plurality of kinds of engagement/release patterns for setting a predetermined speed stage. Thus, the automatic transmission A is set to the plural speed stages by engaging or releasing the frictional engagement means with the oil pressure which is outputted from the hydraulic control means C.

This hydraulic control means C is equipped with a plurality of (not-shown) solenoid valves, for example, which are to be turned on and off in response to signals outputted from the control means E. This control means E is constructed mainly of a microcomputer and is fed with the vehicle speed V, the throttle opening $\theta$ and the shift positions such as the neutral range (i.e., N-range) and the drive range (i.e., D-range) selected by the shift lever. The control means E is equipped with low speed stage detection means 20, speed stage selection means 21 and engagement/release pattern selection means 22.

The low speed stage detection means 20 outputs a signal if it detects that a speed stage to be set is low (e.g., the 1st speed) to have a large gear ratio because of the low speed V or the stop of the vehicle in case the speed stage is switched from the neutral or parking range to a running range such as the drive range. On the other hand, the speed stage selection means 21 selects a higher speed stage having a lower gear ratio than that of the aforementioned low speed stage, in case the low speed stage detection means 20 outputs its signal, and outputs the aforementioned low speed stage after it has set the higher speed stage for a while. On the other hand, the engagement/release pattern selection means 22 selects such an engagement/release pattern as will have two or less frictional engagement means switched in their engagement/release states when a shift is made to the aforementioned low speed stage from the aforementioned higher speed stage which was temporarily set when the shift is switched from the neutral stage to a predetermined running range. Then, the engagement/release pattern selection means 22 outputs a signal to the hydraulic control means C so as to achieve that engagement/release pattern.

Incidentally, the gear train in the automatic transmission A thus far described can select the socalled "intermediate stage" such as the 2.2th speed. Despite of this fact, however, the aforementioned control means E is adapted to select the major speed stages having gear ratios closely approximate to the geometric series such as the 1st, 2nd, 3rd, 4th and 5th speeds and one reverse stage.

The shift controls by the control means E thus far described for reducing the squat are accomplished in the following manner. Incidentally, the following example of the control method premises that the automatic transmission A shown in FIG. 21 is equipped with the aforementioned gear train shown in FIG. 2, and can select any of the engagement/release patterns tabulated in Table 1.

Figure 22:
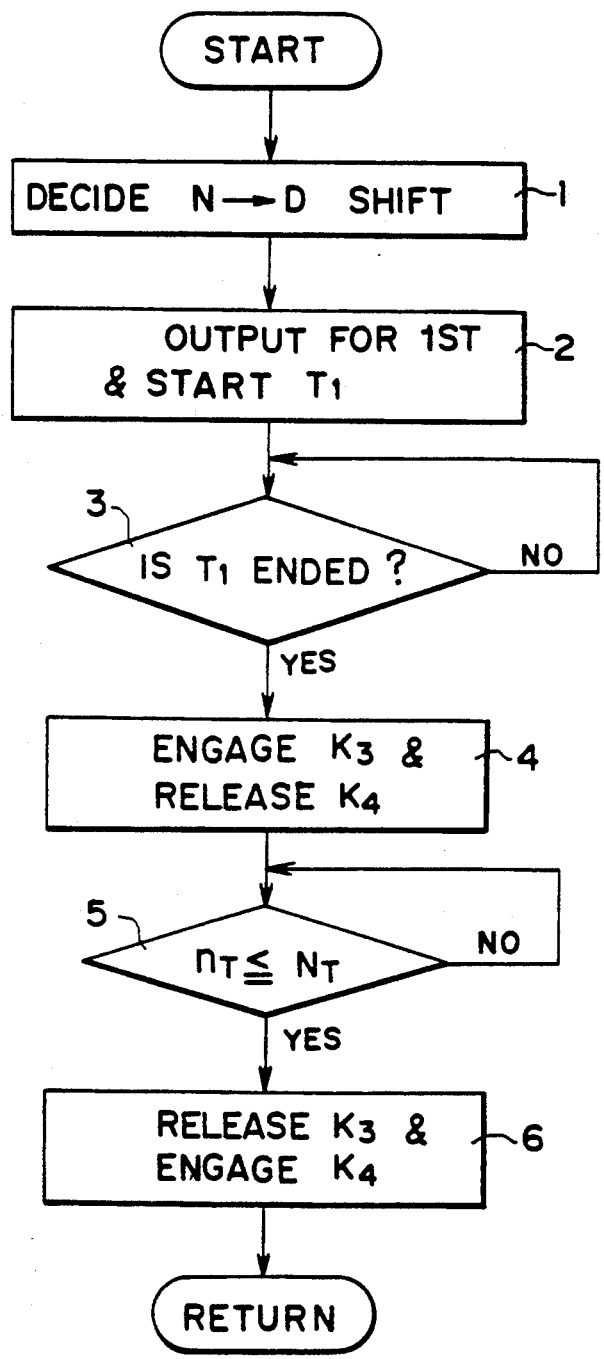
FIG. 22 is a flow chart for explaining another embodiment of the shift control method.

FIG. 22 is a flow chart for explaining the shift controls by the system shown in FIG. 21. It is decided (at Step 1) on the basis of the input signal that the shift from the neutral range to the drive range (i.e., the shift from N to D) has been performed in the stop state or in a low speed running state near the stop. Then, an output for setting the 1st speed is made, and a built-in timer starts (at Step 2) the counting of a predetermined time period T1. If, in the automatic transmission A shown in FIG. 3, the first clutch means K1 and the third clutch means K3 are released, the torque of the input shaft 4 is not transmitted to the gear train. In the N (i.e., neutral) range, therefore, the oil pressure is supplied to engage the fourth clutch means K4, the fifth clutch means K5 and the first brake means B1, for example, the supply of the oil pressure to the first clutch means K1 is started by the output for setting the 1st speed. On the other hand, the setting time period T1 is provided for retaining the time period required for filling up the oil pressure circuit with the oil pressure to some extent while the first clutch means K1 is not completely engaged. At Step 3, the count-up by the timer is decided, and this decision is continued till "YES". At the instant of ending the count of the set time period T1, the third clutch means K3 is fed with the oil pressure and is engaged, and the fourth clutch means K4 is drained and released (at Step 4). Of the frictional engagement means, the first clutch means K1, the third clutch means K3, the fifth clutch means K5 and the first brake means B1 are resultantly engaged so that the forward 3rd speed is set according to the pattern ① of the column a of the 3rd speed of Table 1. Next, the number $n_T$ of revolution of the input shaft 4 of the automatic transmission A is compared (at Step 5) with a set number $N_T$ of revolution. It is decided in terms of the number of revolution of the input shaft 4 that the setting of the forward 3rd speed has been completed, because the number of revolution of the input shaft 4 will drop according to the gear ratio of the set forward 3rd speed. At the instant when the number $n_T$ of revolution of the input shaft 4 is exceeded by the set number $N_T$ of revolution, the third clutch means K3 is drained and released to the contrary of the case of Step 4, and the fourth clutch means K4 is fed with the oil pressure and is engaged (at Step 6). Incidentally, in place of the detection of the number $n_T$ of revolution of the input shaft 4, the lapse of the predetermined time period is detected by the timer so that the operation of Step 6 may be executed in terms of the lapse of the time period. As a result, the first clutch means K1, the fourth clutch means K4, the fifth clutch means K5 and the first brake means B1 of the frictional engagement means are engaged to set the forward 1st speed according to the pattern ① of Table 1.

In case of a shift from the N-range to the D-range, therefore, the 3rd speed is at first set, and the 1st speed is then set. As a result, the torque of the output shaft 5 is augmented not abruptly but gently to reduce the squat thereby to prevent the rear portion of the vehicle from diving. Since, on the other hand, the shift from the 3rd to 1st speeds can be executed by changing the engagement/release states of the two clutch means of the third clutch means K3 and the fourth clutch means K4, little timing lag is invited for switching the individual clutch means so that the shift shocks can be effectively prevented.

The shift pattern described above is used to make a change from the pattern ① of the column a of the 3rd speed to the pattern ① of the 1st speed, as tabulated in Table 29.

TABLE 29

|  |  |  | Clutch Means | | | | | Brake Means | | | |
| --- | --- | --- | --- | --- | --- | --- | --- | --- | --- | --- | --- |
|  |  |  | K1 | K2 | K3 | K4 | K5 | B1 | B2 | B3 | B4 |
| 3rd | a | ① | ○ |  | ○ |  | ○ | ○ | * |  |  |
| 1st |  | ① | ○ |  |  | ○ | ○ | ○ | * |  |  |

Incidentally, the engagement/release pattern of the speed stage to be set prior to the setting of the 1st speed should not be limited to the aforementioned example but can be determined in relation to the engagement/release pattern for setting the 1st speed, as exemplified in Tables 30 to 33. Of these, the example of Table 30 is used to set the 1st speed once the 3rd speed is set, and the examples of Tables 31 and 32 are used to set the 1st speed once the 4th speed is set. On the other hand, the example of Table 33 is used to set the 1st speed once the 2.7th speed not for ordinary use is set. In any of these cases, the number of the frictional engagement means to have their engagement/release states switched for the shift to the 1st speed is two or less so that the shift shocks can be effectively prevented.

TABLE 30

|  |  |  | Clutch Means | | | | | Brake Means | | | |
| --- | --- | --- | --- | --- | --- | --- | --- | --- | --- | --- | --- |
|  |  |  | K1 | K2 | K3 | K4 | K5 | B1 | B2 | B3 | B4 |
| 3rd | a | ② |  | ○ |  | ○ |  | ○ | * |  | ○ |
| 1st |  | ② |  | ○ |  |  | ○ | ○ | * |  | ○ |

TABLE 31

|  |  |  | Clutch Means | | | | | Brake Means | | | |
| --- | --- | --- | --- | --- | --- | --- | --- | --- | --- | --- | --- |
|  |  |  | K1 | K2 | K3 | K4 | K5 | B1 | B2 | B3 | B4 |
| 4th | a | ④ |  | ○ | ○ | * |  | ○ | ○ |  |  |

TABLE 31-continued

|  |  |  | Clutch Means | | | | | Brake Means | | | |
| --- | --- | --- | --- | --- | --- | --- | --- | --- | --- | --- | --- |
|  |  |  | K1 | K2 | K3 | K4 | K5 | B1 | B2 | B3 | B4 |
| 1st |  | ① | ○ |  |  | ○ | ○ | ○ | * |  |  |

TABLE 32

|  |  |  | Clutch Means | | | | | Brake Means | | | |
| --- | --- | --- | --- | --- | --- | --- | --- | --- | --- | --- | --- |
|  |  |  | K1 | K2 | K3 | K4 | K5 | B1 | B2 | B3 | B4 |
| 4th | a | ④ |  | ○ | * |  | ○ | ○ | ○ |  |  |
| 1st |  | ① | ○ |  |  | ○ | ○ | ○ | * |  |  |

TABLE 33

|  |  |  | Clutch Means | | | | | Brake Means | | | |
| --- | --- | --- | --- | --- | --- | --- | --- | --- | --- | --- | --- |
|  |  |  | K1 | K2 | K3 | K4 | K5 | B1 | B2 | B3 | B4 |
| 2.7th |  |  | ○ | ○ |  | ○ |  | ○ |  |  |  |
| 1st |  | ③ | ○ |  |  | ○ | * | ○ | ○ |  |  |

The shifts for selecting the engagement/release patterns tabulated in Tables 29 and 30 are performed to reduce the squat for the automatic transmission A which is equipped with the gear train shown in FIG. 2. Despite of this fact, however, shift controls like the aforementioned example could be accomplished even if the gear train has the structure shown in FIG. 3 or FIGS. 5 or 6.

If, on the other hand, the gear train has any of the structures shown in FIGS. 7 to 12, the squat can be reduced in the shifts by selecting the engagement/release patterns tabulated in Table 30.

Since the automatic transmission A equipped with the gear trains having any of the structures shown in FIGS. 13 to 18 can select the speed stages and the engagement/release patterns tabulated in Table 13, an engagement/release pattern appearing in any of the following Tables 34 to 39 is selected in case the shift is intended to reduce the squat.

TABLE 34

|  |  |  | Clutch Means | | | | | Brake Means | | | |
| --- | --- | --- | --- | --- | --- | --- | --- | --- | --- | --- | --- |
|  |  |  | K1 | K2 | K3 | K4 | K5 | B1 | B2 | B3 | B4 |
| 3rd | a | ① | ○ |  | ○ |  | ○ | ○ | * |  |  |
| 1st |  | ① | ○ |  |  | ○ | ○ | ○ | * |  |  |

TABLE 35

|  |  |  | Clutch Means | | | | | Brake Means | | | |
| --- | --- | --- | --- | --- | --- | --- | --- | --- | --- | --- | --- |
|  |  |  | K1 | K2 | K3 | K4 | K5 | B1 | B2 | B3 | B4 |
| 3rd | a | ② |  | ○ |  | ○ |  | ○ | * | ○ |  |
| 1st |  | ② |  | ○ |  |  | ○ | ○ | * | ○ |  |

TABLE 36

|  |  |  | Clutch Means | | | | | Brake Means | | | |
| --- | --- | --- | --- | --- | --- | --- | --- | --- | --- | --- | --- |
|  |  |  | K1 | K2 | K3 | K4 | K5 | B1 | B2 | B3 | B4 |
| 4th |  | ② |  | ○ | ○ | * |  | ○ | ○ |  |  |
| 1st |  | ① | ○ |  |  | ○ | ○ | ○ | * |  |  |

TABLE 37

|  |  |  | Clutch Means | | | | | Brake Means | | | |
| --- | --- | --- | --- | --- | --- | --- | --- | --- | --- | --- | --- |
|  |  |  | K1 | K2 | K3 | K4 | K5 | B1 | B2 | B3 | B4 |
| 4th |  | ② |  | ○ | ○ | * |  | ○ | ○ |  |  |
| 1st |  | ② |  | ○ |  |  | ○ | ○ | * |  | ○ |

TABLE 38

| | | Clutch Means | | | | | Brake Means | | | |
|---|---|---|---|---|---|---|---|---|---|---|
| | | K1 | K2 | K3 | K4 | K5 | B1 | B2 | B3 | B4 |
| 4th | ③ | ○ | * | ○ | ○ | ○ | | | | |
| 1st | ① | ○ | | | | | ○ | ○ | ○ | * |

TABLE 39

| | | Clutch Means | | | | | Brake Means | | | |
|---|---|---|---|---|---|---|---|---|---|---|
| | | K1 | K2 | K3 | K4 | K5 | B1 | B2 | B3 | B4 |
| 4th | ③ | ○ | * | ○ | ○ | ○ | | | | |
| 1st | ② | ○ | | | | | ○ | ○ | * | ○ |

Figure 23:
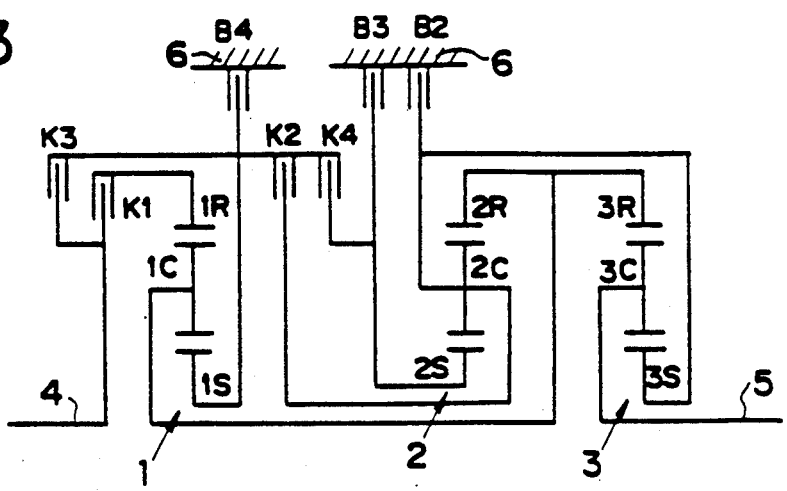
FIGS. 23 to 28 are skeleton diagrams showing still other examples of the gear train.
Figure 24:
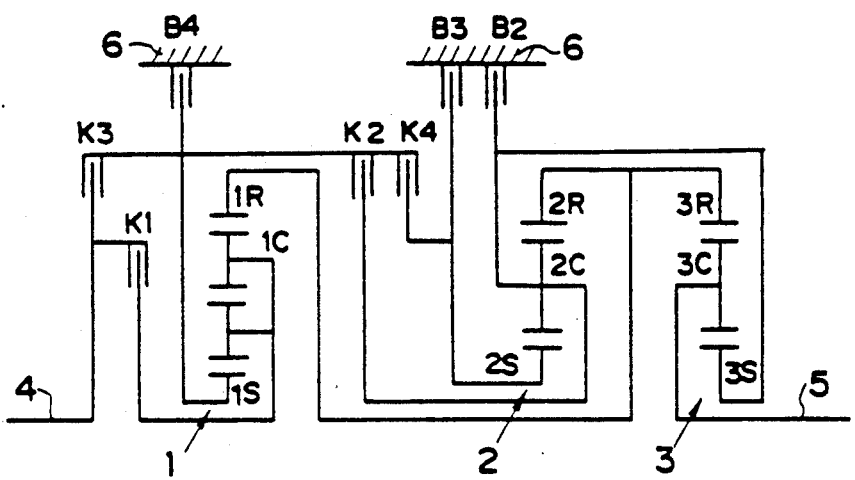
Figure 25:
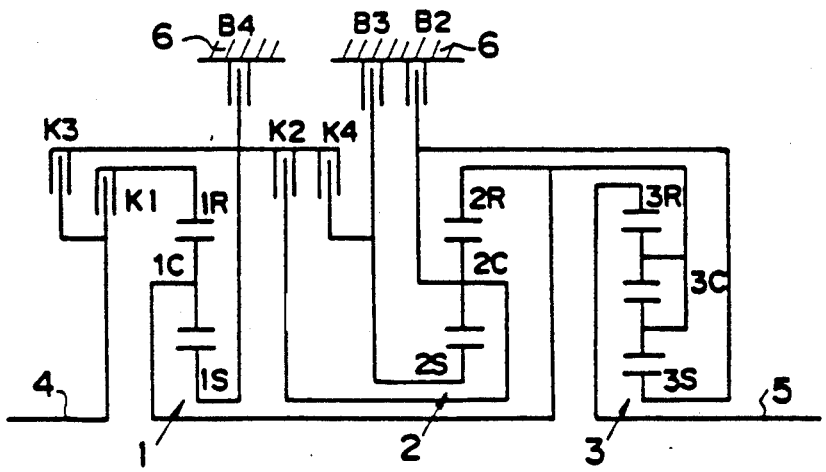

FIGS. 23 to 28 are diagrams showing other examples of the gear train to be adopted in the automatic transmission A according to the present invention. Specifically, the structure shown in FIG. 23 is modified from that shown in FIG. 13 by eliminating the fifth clutch means K5, by connecting the carrier 2C of the second planetary gear set 2 and the sun gear 3S of the third planetary gear set 3 at all times and by eliminating the first brake means B1. On the other hand, the structure shown in FIG. 24 is likewise modified from that shown in FIG. 14 by eliminating the fifth clutch means K5 and the first brake means B1. Moreover, the structure shown in FIG. 25 is modified from that shown in FIG. 15 by eliminating the fifth clutch means K5 and the first brake means B1.

Figure 26:
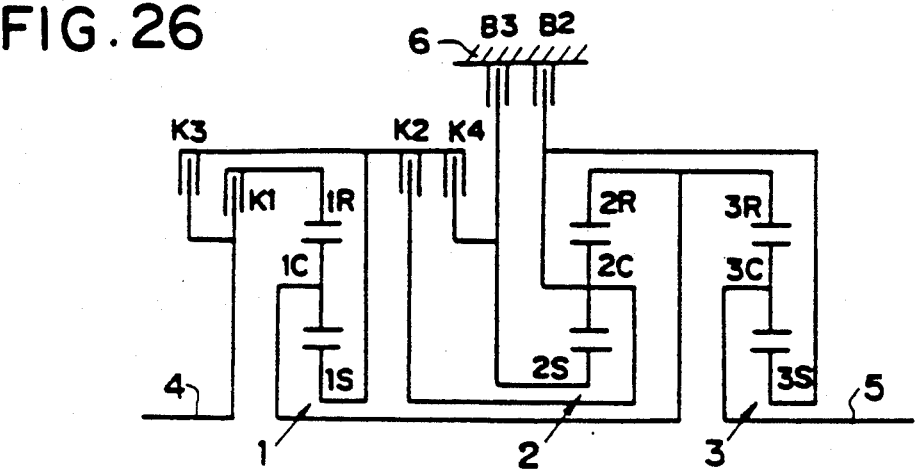
Figure 27:
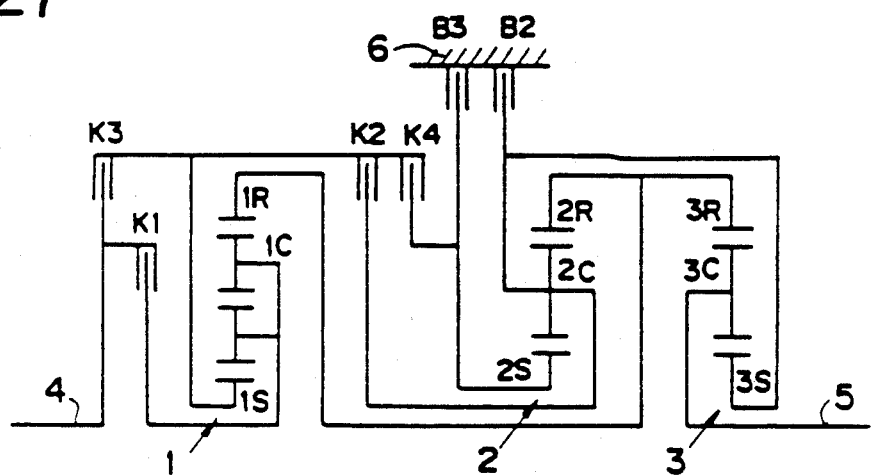
Figure 28:
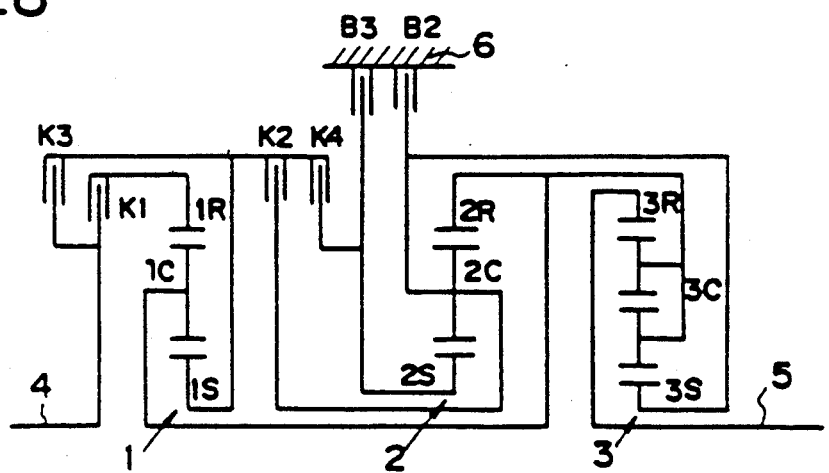

The structure shown in FIG. 26 is modified from that shown in FIG. 13 by eliminating the fifth clutch means K5, by connecting the carrier 2C of the second planetary gear set 2 and the sun gear 3S of the third planetary gear set 3 at all times, and by eliminating the first and fourth brake means B1 and B4. On the other hand, the structure shown in FIG. 27 is likewise modified from that shown in FIG. 14 by eliminating the fifth clutch means K5, the first brake means B1 and the fourth brake means B4. Moreover, the structure shown in FIG. 28 is modified from that shown in FIG. 15 by eliminating the fifth clutch means K5, the first brake means B1 and the fourth brake means B4.

The automatic transmissions having the structure shown in FIGS. 23 to 28 are substantially similar to those shown in FIGS. 13 to 18 if the fifth clutch means K5 is engaged at all times and if the first brake means B1 is released at all times. If these automatic transmissions of FIGS. 23 to 28 are the subject of the present invention, the squat reduction control may be performed according to Table 35, 37 or 39 of Tables 34 to 39.

In case the squat reducing shift control is to be performed for either the automatic transmission A equipped with the gear train shown in FIG. 19 or the automatic transmission A equipped with the gear train shown in FIG. 20, the engagement/release patterns, as exemplified in the following Tables 40 to 45, may be selected:

TABLE 40

| | | Clutch Means | | | | Brake Means | | |
|---|---|---|---|---|---|---|---|---|
| | | K1 | K2 | K3 | K4 | B1 | B2 | B3 |
| 3rd | ① | ○ | ○ | * | | | ○ | |
| 1st | ① | ○ | | | | ○ | ○ | * |

TABLE 41

| | | Clutch Means | | | | Brake Means | | |
|---|---|---|---|---|---|---|---|---|
| | | K1 | K2 | K3 | K4 | B1 | B2 | B3 |
| 3rd | ② | ○ | * | ○ | | | ○ | |
| 1st | ① | ○ | | | | ○ | ○ | * |

TABLE 42

| | | Clutch Means | | | | Brake Means | | |
|---|---|---|---|---|---|---|---|---|
| | | K1 | K2 | K3 | K4 | B1 | B2 | B3 |
| 4th | ① | ○ | ○ | * | ○ | | | |
| 1st | ① | ○ | | | | | ○ | * |

TABLE 43

| | | Clutch Means | | | | Brake Means | | |
|---|---|---|---|---|---|---|---|---|
| | | K1 | K2 | K3 | K4 | B1 | B2 | B3 |
| 4th | ① | ○ | ○ | * | ○ | | | |
| 1st | ② | ○ | | | | | * | ○ |

TABLE 44

| | | Clutch Means | | | | Brake Means | | |
|---|---|---|---|---|---|---|---|---|
| | | K1 | K2 | K3 | K4 | B1 | B2 | B3 |
| 4th | ② | ○ | * | ○ | ○ | | | |
| 1st | ① | ○ | | | | ○ | | * |

TABLE 45

| | | Clutch Means | | | | Brake Means | | |
|---|---|---|---|---|---|---|---|---|
| | | K1 | K2 | K3 | K4 | B1 | B2 | B3 |
| 4th | ② | ○ | * | ○ | ○ | | | |
| 1st | ② | ○ | | | | | * | ○ |

Even for the automatic transmissions shown in FIGS. 19 and 20, therefore, the shifts to the 1st speed can be achieved by switching the two frictional engagement means so that the shift shocks are hardly deteriorated.

As is now apparent from the description thus far made, the control system of the present invention has two or less frictional engagement means switched for a shift to a lower speed stage such as the 1st speed from a higher speed stage, in case the squat reduction control is to be performed. As a result, the dive of the vehicle can be effectively prevented without deteriorating the shift shocks. In other words, the number of frictional engagement means to be switched is two or less so that the control can be simplified.

Although the foregoing individual embodiments are exemplified by setting the forward five speed stages, the automatic transmission equipped with the shown gear train can set at least forward seven speed stages. Thus, the automatic transmission can select and set a proper one from those seven speed stages in accordance with the characteristics required of the vehicle.

Specifically, a vehicle having an excellent fuel economy can be provided, if the number of speed stages to be set is decreased and if an upshift is to be effected in the state of relatively low vehicle speed. On the other hand, a powerful vehicle can be provided if the number of speed stages to be set is increased and if a lower speed stage is used to a relatively high vehicle speed.

Tables 46 and 47 are clutch and brake application charts for the two running modes of an automatic transmission equipped with the gear train shown in FIG. 5. Incidentally, the gear ratios of these Tables take the values in case the gear ratios of the individual planetary gear sets 1, 2 and 3 are at ρ1=0.450 and ρ2=ρ3=0.405.

TABLE 46

|  |  |  | Clutch Means | | | | | Brake Means | | | Gear Ratio |
|---|---|---|---|---|---|---|---|---|---|---|---|
|  |  |  | K1 | K2 | K3 | K4 | K5 | B1 | B2 | B3 |  |
| 1st |   | ③ | O |   |   | O | * | O | O |   | 3.149 |
| 2nd | b |   | O |   |   | O |   |   | O | O | 2.037 |
| 3rd | b |   | O |   | O |   |   |   | O | * | 1.405 |
|     | c |   | O |   | O | * |   | O |   |   |       |
| 4th | a | ① | * | O | O | O |   | * |   |   | 1.000 |
| 5th | a |   |   | O | O |   |   | * |   | O | 0.712 |
| Rev | a | ① |   | O | O |   | * | * | O |   | −2.469 |

TABLE 47

|  |  |  | Clutch Means | | | | | Brake Means | | | Gear Ratio |
|---|---|---|---|---|---|---|---|---|---|---|---|
|  |  |  | K1 | K2 | K3 | K4 | K5 | B1 | B2 | B3 |  |
| 1st |   | ② | O |   |   | O | O | * | O |   | 3.149 |
| 2.5th |  |   | O |   |   | O | O |   |   | O | 1.619 |
| 4th | a | ④ | O | * | O | O | O |   |   |   | 1.000 |
|     |   | ① | * | O | O | O | * |   |   |   |       |
| 5th | a |   |   | O | O |   | * |   |   | O | 0.712 |
| Rev | a | ① |   | O | O |   | * | * | O |   | −2.469 |

Tables 46 shows an application chart for setting five forward speeds and one reverse speed. The engagement/release patterns of the frictional engagement means for setting the forward speeds are selected from Table 1. As shown in Table 46, the shift between the first speed and second speed is executed by switching the second brake B2 and the third brake B3. The shift between the second speed and third speed is executed by switching the third clutch K3 and the fourth clutch K4. The other shifts between the third speed and fourth speed, and the fourth speed and fifth speed are executed by switching two frictional engagement means, same as the above-mentioned shifts.

Table 47 shows an application chart for setting four forward speeds and one reverse speed. In this running mode, the 2.5th speed is set instead of the second speed and third speed in the running mode shown in Table 46. Although the other speeds except the 2.5th speed are the same as in the running mode shown in Table 46, the engagement/release patterns for setting the first speed and fourth speed in the running mode shown in Table 47 are different from the ones in the running mode shown in Table 46. Accordingly, in the running mode shown in Table 47, the shift between the adjacent speeds is achieved by switching only two frictional engagement means.

The change of the running mode and the selection of the engagement/release patterns are achieved by a control system shown in Table 29. The shift decision means 10 decides the shift based on the vehicle speed V and the throttle opening θ. On the other hand, a mode selection means 13 selects one of the running modes from those shown in Tables 46 and 47. These operations are executed according to a manual operation by a driver or a speed of stepping on an accelerator pedal. The speed stage selection means 11 selects a speed stage suited for the vehicle speed V and the throttle opening θ from those enumerated in Tables 46 or 47 which is selected by the mode selection means 13.

Moreover, the engagement/release selecting means 12 selects such one of the engagement/release patterns of the frictional engagement means for setting a selected speed stage from Table 46 or 47 as accords to the selected running mode. Then, an instruction signal for achieving the selected engagement/release pattern is outputted from the control means E to the hydraulic control means C.

As a result, the aforementioned system can have its shift control facilitated, because the number of the frictional engagement means to be switched for a shift is only two even if the running modes are switched. Moreover, the shift shocks can be reduced.

In the automatic transmission equipped with the gear train shown in FIG. 10, the clutch and brake application charts in case the shift is executed by switching the running modes for the forward five stages and the running modes for the forward four stages are enumerated in Tables 48 and 49, respectively:

TABLE 48

|  |  | Clutch Means | | | | Brake Means | | Gear Ratio |
|---|---|---|---|---|---|---|---|---|
|  |  | K1 | K2 | K3 | K4 | B2 | B3 |  |
| 1st |   | O |   |   | O | O |   | 3.149 |
| 2nd |   | O | O |   |   | O |   | 2.037 |
| 3rd |   | O |   | O |   | O |   | 1.405 |
| 4th | ① | O | O | O | * |   |   | 1.000 |
|     | ④ | * | O | O | O |   |   |       |
| 5th |   | O | O |   |   |   | O | 0.712 |
| Rev |   |   | O |   | O | O |   | −2.469 |

TABLE 49

|  |  | Clutch Means | | | | Brake Means | | Gear Ratio |
|---|---|---|---|---|---|---|---|---|
|  |  | K1 | K2 | K3 | K4 | B2 | B3 |  |
| 1st |   | O |   |   | O | O |   | 3.149 |
| 2.5th |   | O |   |   | O | O | O | 1.619 |
| 4th | ③ | O | * |   | O | O |   | 1.000 |
|     | ④ | * |   | O | O | O |   |       |
| 5th |   | O | O |   |   |   | O | 0.712 |
| Rev |   |   | O |   | O | O |   | −2.469 |

In the automatic transmission equipped with the gear train shown in FIG. 16, the clutch and brake application charts in case the shift is executed by switching the running modes for the forward five stages and the running modes for the forward four states are enumerated in Tables 50 and 51, respectively. Here, the gear ratios appearing in Tables 50 and 51 take values in case the gear ratios of the individual planetary gear sets 1, 2 and 3 of the gear train shown in FIG. 16 are ρ1=0.450, ρ2=0.569, and ρ3=0.405.

TABLE 50

|  |  |  | Clutch Means | | | | | Brake Means | | | Gear Ratio |
|---|---|---|---|---|---|---|---|---|---|---|---|
|  |  |  | K1 | K2 | K3 | K4 | K5 | B1 | B2 | B3 |  |
| 1st |   | ③ | O |   |   | O | * | O | O |   | 3.149 |
| 2nd | b |   | O |   |   | O |   |   | O | O | 2.037 |
| 3rd | c | ② | O | O | * |   |   |   | O |   | 1.405 |
| 4th |   | ② | O | O | * |   | O |   |   |   | 1.000 |
|     |   | ④ | * |   | O | O | O |   |   |   |       |
| 5th |   |   |   |   | O | O | O |   |   | O | 0.712 |
| Rev |   | ③ |   |   | O | O | * |   | O | O | −2.469 |

TABLE 51

|  |  |  | Clutch Means | | | | | Brake Means | | | Gear Ratio |
|---|---|---|---|---|---|---|---|---|---|---|---|
|  |  |  | K1 | K2 | K3 | K4 | K5 | B1 | B2 | B3 |  |
| 1st |   | ② | O |   |   | O | O | * | O |   | 3.149 |
| 2.5th |  |   | O |   |   | O | O |   |   | O | 1.619 |
| 4th |   | ③ | O | * | O | O | O |   |   |   | 1.000 |
|     |   | ④ | * |   | O | O | O |   |   |   |       |
| 5th |   |   |   |   | O | O | * |   |   | O | 0.712 |
| Rev |   | ③ |   |   | O | O | * | O | O |   | −2.469 |

Thus, the shift in each running mode can be executed without causing the so-called "simultaneous shift" no matter whether the automatic transmission might be equipped with the gear train shown in FIG. 10 or FIG. 16.

What is claimed is:

1. In an automatic transmission comprising: a plurality of frictional engagement means; and a gear train adapted to be set to a plurality of speed stages of different gear ratios according to the engagement/release states of said frictional engagement means and having a plurality of different engagement/release combinations for said frictional engagement means to set a predetermined one of said speed stages, a shift control system comprising:

shift decision means for deciding a shift to be performed from a current speed stage;

speed stage selection means for determining a speed stage to be set after said shift; and engagement/release pattern selection means for selecting and outputting such one of the engagement/release combinations of said frictional engagement means for setting a speed stage, wherein at least one of the current speed stage and the speed stage to be set after the shift is said predetermined one of the speed stages, and wherein two or less of such frictional engagement means have their engagement/release states switched during the shift.

2. A shift control system for use in an automatic transmission according to claim 1, wherein said engagement/release pattern selection means selects such one of the engagement/release combinations of said frictional engagement means for setting said speed stages as to reduce to two or less both the number of said frictional engagement means having their engagement/release states switched at the time of an upshift from said current speed to said speed stage to be set and the number of said frictional engagement means having their engagement/release states switched at the time of a downshift from said speed stage to said still another speed stage.

3. A shift control system for use in an automatic transmission according to claim 1, further comprising mode selection means for selecting one of at least two kinds of speed stage sets, said two kinds of speed stage sets including a first speed stage set including a plurality of speed stages and a second speed stage set including a speed stage identical to a speed stage of said first speed stage set and a speed stage having a gear ratio different from any of the speed stages of said first speed stage set, wherein said engagement/release pattern selection means selects and outputs such one of the engagement/release combinations of said frictional engagement means for setting a speed stage, wherein at least one of the speed stages before the shift is said identical speed stage, and wherein two or less of said frictional engagement means have their engagement/release states switched during the shift.

4. A shift control system for use in an automatic transmission according to claim 3, wherein the gear ratio of at least one speed stage in said first speed stage set has an intermediate value of the gear ratios of adjoining speed stages of said second speed stage set.

5. A shift control system for use in an automatic transmission according to claim 1, wherein said gear train comprises:

an input shaft;

an output shaft;

a first planetary gear set comprising a first sun gear, a first ring gear, a pinion gear meshing with said first sun gear and said first ring gear, and a first carrier supporting said pinion gear;

a second planetary gear set comprising a second sun gear connectable to said first sun gear, a second ring gear, a pinion gear meshing with said second sun gear and said second ring gear, and a second carrier supporting said pinion gear; and a third planetary gear set comprising a third sun gear connectable to said second carrier, a third ring gear connected to said first carrier, a pinion gear meshing with said third sun gear and said third ring gear, and a third carrier supporting said pinion gear and connected to said second ring gear.

6. A shift control system for use in an automatic transmission according to claim 5, wherein said gear train further comprises:

first clutch means for connecting said input shaft and said first ring gear selectively;

second clutch means for connecting said first sun gear and said second carrier selectively;

third clutch means for connecting said input shaft and said first sun gear selectively;

fourth clutch means for connecting said first sun gear and said second sun gear selectively;

first brake means for stopping the revolutions of said second carrier selectively; and second brake means for stopping the revolutions of said second sun gear selectively, and wherein said output shaft is connected to said second ring gear or said third carrier.

7. A shift control system for use in an automatic transmission according to claim 1, wherein said gear train comprises:

an input shaft;

an output shaft;

a first planetary gear set comprising a first sun gear, a first ring gear, a pinion gear meshing with said first sun gear and said first ring gear, and a first carrier supporting said pinion gear;

a second planetary gear set comprising a second sun gear connectable to said first sun gear, a second ring gear connected to said first carrier, a pinion gear meshing with said second sun gear and said second ring gear, and a second carrier supporting said pinion gear; and a third planetary gear set comprising a third sun gear connected integrally or selectively to said second carrier, a third ring gear connectable to said first carrier, a pinion gear meshing with said third sun gear and said third ring gear, and a third carrier supporting said pinion gear.

8. A shift control system for use in an automatic transmission according to claim 7, wherein said gear train further comprises:

first clutch means for connecting said input shaft and said first ring gear selectively;

third clutch means for connecting said input shaft and said first sun gear selectively;

fifth clutch means for connecting said second carrier and said third sun gear selectively;

third brake means for stopping the revolutions of said second sun gear selectively; and first brake means for stopping the revolutions of said third sun gear selectively, and wherein said output shaft is connected to said third carrier.

9. A shift control system for use in an automatic transmission according to claim 8,
wherein said gear train further comprises:
second brake means for stopping the revolutions of said second carrier selectively.

10. A shift control system for use in an automatic transmission according to claim 9,
wherein said gear train further comprises:
second clutch means for connecting said first sun gear and said second carrier selectively; and
fourth clutch means for connecting said first sun gear and said second carrier selectively.

11. A shift control system for use in an automatic transmission according to claim 10,
wherein said gear train further comprises:
fourth brake means for stopping the revolutions of said first sun gear selectively.

12. In an automatic transmission comprising: a plurality of frictional engagement means; and a gear train adapted to be set to a plurality of speed stages of different gear ratios according to the engagement/release states of said frictional engagement means and having a plurality of engagement/release combinations for said frictional engagement means to set a predetermined one of said speed stages,
a shift control system comprising:
low speed stage detection means for detecting that a speed stage to be set subsequent to a neutral state is a low speed stage having a high gear ratio;
speed stage selection means for outputting a signal to set another speed stage having a lower gear ratio than that of said low speed stage when said low speed stage detection means outputs its detection signal; and
engagement/release pattern selection means for selecting and outputting a combination, in which two or less frictional engagement means have their engagement/release states switched at the time of a shift from said another speed stage to said low speed stage, as the engagement/release combination of said frictional engagement means for setting said low speed stage and the engagement/release combination of said frictional engagement means for setting said another speed stage.

13. A shift control system for use in an automatic transmission according to claim 12,
wherein said gear train comprises:
an input shaft;
an output shaft;
a first planetary gear set comprising a first sun gear, a first ring gear, a pinion gear meshing with said first sun gear and said first ring gear, and a first carrier supporting said pinion gear;
a second planetary gear set comprising a second sun gear connectable to said first sun gear, 'a second ring gear, a pinion gear meshing with said second sun gear and said second ring gear, and a second carrier supporting said pinion gear; and
a third planetary gear set comprising a third sun gear connectable said second carrier, a third ring gear connected to said first carrier, a pinion gear meshing with said third sun gear and said third ring gear, and a third carrier supporting said pinion gear and connected to said second ring gear.

14. A shift control system for use in an automatic transmission according to claim 13,
wherein said gear train further comprises:
first clutch means for connecting said input shaft and said first ring gear selectively;
second clutch means for connecting said first sun gear and said second carrier selectively;
third clutch means for connecting said input shaft and said first sun gear selectively;
fourth clutch means for connecting said first sun gear and said second sun gear selectively;
first brake means for stopping the revolutions of said second carrier selectively; and
second brake means for stopping the revolutions of said second sun gear selectively, and
wherein said output shaft is connected to said second ring gear or said third carrier.

15. A shift control system for use in an automatic transmission according to claim 12,
wherein said gear train comprises:
an input shaft;
an output shaft;
a first planetary gear set comprising a first sun gear, a first ring gear, a pinion gear meshing with said first sun gear and said first ring gear, and a first carrier supporting said pinion gear;
a second planetary gear set comprising a second sun gear connectable to said first sun gear, a second ring gear connected to said first carrier, a pinion gear meshing with said second sun gear and said second ring gear, and a second carrier supporting said pinion gear; and
a third planetary gear set comprising a third sun gear connectable to said second carrier, a third ring gear connected to said second ring gear, a pinion gear meshing with said third sun gear and said third ring gear, and a carrier supporting said pinion gear.

16. A shift control system for use in an automatic transmission according to claim 15,
first clutch means for connecting said input shaft and said first ring gear selectively;
third clutch means for connecting said input shaft and said first sun gear selectively;
fifth clutch means for connecting said second carrier and said third sun gear selectively;
second brake means for stopping the revolutions of said second sun gear selectively; and
third brake means for stopping the revolutions of said third sun gear selectively, and
wherein said output shaft is connected to said third carrier.

17. A shift control system for use in an automatic transmission according to claim 16,
wherein said gear train further comprises:
first brake means for stopping the revolutions of said second carrier selectively.

18. A shift control system for use in an automatic transmission according to claim 17,
wherein said gear train further comprises:
second clutch means for connecting said first sun gear and said second carrier selectively; and
fourth clutch means for connecting said first sun gear and said second sun gear selectively.

19. A shift control system for use in an automatic transmission according to claim 18,
wherein said gear train further comprises: fourth brake means for stopping the revolutions of said first sun gear.

20. In an automatic transmission comprising: a plurality of frictional engagement means; and a gear train adapted to be set to a plurality of speed stages of different gear ratios according to the engagement/release states of said frictional engagement means and having a plurality of engagement/release combinations for said frictional engagement means to set a predetermined one of said speed stages, a shift control system wherein, in case a speed stage to be set subsequent to a neutral state is a low speed stage having a high gear ratio, a signal is outputted to set another speed stage having a lower gear ratio than that of said low speed stage, and wherein a combination, in which two or less frictional engagement means have their engagement/release states switched at the time of a shift from said another speed stage to said low speed stage, is selected as the engagement/release combination of said frictional engagement means for setting said low speed stage and the engagement/release combination of said frictional engagement means for setting said another speed stage.

21. In an automatic transmission comprising: a plurality of frictional engagement means; and a gear train adapted to be set to a plurality of speed stages of different gear ratios according to the engagement/release states of said frictional engagement means and having a plurality of different engagement/release combinations for said frictional engagement means to set a predetermined one of said speed stages, a shift control method comprising:
a first step of deciding a shift to be performed from a current speed stage;
a second step of determining a speed stage to be set after said shift; and
a third step of selecting and outputting such one of the engagement/release combinations of said frictional engagement means for setting a speed stage, wherein at least one of the current speed stage and the speed stage to be set after the shift is said predetermined one of the speed stages, that two or less of said frictional engagement means have their engagement/release states switched during the shift to said speed stage after the shift.

22. A shift control method for use in an automatic transmission according to claim 21,
wherein said third step selects such one of the engagement/release combinations of said frictional engagement means for setting said speed stages before the shift as to reduce to two or less both the number of said frictional engagement means having their engagement/release states switched at the time of an upshift from said speed stage to said another speed stage after the shift and the number of said frictional engagement means having their engagement/release states switched at the time of a downshift from said speed stage before the shift to said still another speed stage.

* * * * *